United States Patent
Spera (10) Patent No.: US 11,891,484 B2
(45) Date of Patent: Feb. 6, 2024

(54) PUTTY AND PUTTY BASE COMPOUNDS AND METHODS OF MAKING THEREOF

(71) Applicant: Crayola LLC, Easton, PA (US)

(72) Inventor: Michael L. Spera, Mohnton, PA (US)

(73) Assignee: Crayola LLC, Easton, PA (US)

( * ) Notice: Subject to any disclaimer, the term of this patent is extended or adjusted under 35 U.S.C. 154(b) by 39 days.

(21) Appl. No.: 16/883,422

(22) Filed: May 26, 2020

(65) Prior Publication Data

US 2021/0079168 A1    Mar. 18, 2021

Related U.S. Application Data

(60) Provisional application No. 62/901,331, filed on Sep. 17, 2019.

(51) Int. Cl.

| | |
|---|---|
| *C08G 77/06* | (2006.01) |
| *C08K 3/013* | (2018.01) |
| *C08L 83/04* | (2006.01) |
| *C08G 77/58* | (2006.01) |
| *C08K 5/56* | (2006.01) |
| *C08G 77/16* | (2006.01) |

(52) U.S. Cl.
CPC ............. *C08G 77/06* (2013.01); *C08G 77/58* (2013.01); *C08K 3/013* (2018.01); *C08L 83/04* (2013.01); *C08G 77/16* (2013.01); *C08K 5/56* (2013.01)

(58) Field of Classification Search
None
See application file for complete search history.

(56) References Cited

U.S. PATENT DOCUMENTS

| | | |
|---|---|---|
| 2,541,851 A | 2/1951 | Wright |
| 3,177,176 A | 4/1965 | Boot et al. |
| 5,472,994 A * | 12/1995 | Micallef ................ C08L 83/14 524/588 |
| 5,595,826 A | 1/1997 | Gray et al. |
| 8,664,328 B2 | 3/2014 | Cauvin et al. |
| 8,846,808 B2 | 9/2014 | Heldmann |
| 9,550,864 B2 | 1/2017 | Bloomfield |
| 10,358,528 B2 | 7/2019 | Bloomfield |
| 2006/0243947 A1* | 11/2006 | Tsumura ............... C08F 290/06 252/299.01 |
| 2006/0293469 A1 | 12/2006 | Zech et al. |
| 2011/0033627 A1 | 2/2011 | Cauvin et al. |
| 2012/0329896 A1* | 12/2012 | Bloomfield .......... C08K 5/5415 521/152 |
| 2014/0329975 A1 | 11/2014 | Swanton et al. |
| 2015/0174020 A1 | 6/2015 | Colaco et al. |
| 2015/0344635 A9* | 12/2015 | Bloomfield ............ C08L 83/04 524/588 |

FOREIGN PATENT DOCUMENTS

| | | | |
|---|---|---|---|
| EP | 0522738 A1 * | 1/1993 | ............... C08K 9/06 |
| WO | 2013023174 A1 | 2/2013 | |
| WO | 2014177710 A1 | 11/2014 | |

OTHER PUBLICATIONS

International Search Report and Written Opinion for International Application No. PCT/US2020/51010, dated Dec. 17, 2020, 16 pages,.
Candidate List of Substances of Very High Concem for Authorisation—ECHA, downloaded from http://echa.europa.eu/candidate-list-table, Apr. 11, 2022, 15 pages.
Reach, Article 56, General Provisons, ReachOnline, downloaded at https://reachonline.eu/reach/en/title-vii-chapter-1-article-56.html, Apr. 11, 2022, 3 pages.
Reach, Article 57, Substances to Be Incuded in Annex XIV—ReachOnline, downloaded at https://reachonline.eu/reach/en/title-vii-chapter-1-article-57.html, Apr. 11, 2022, 2 pages.
Reach, Article 59, Identification of Substances Referred to in Article 57, ReachOnline, downloaded at https://reachonline.eu/reach/en/title-vii-chapter-1-article-59.html, Apr. 11, 2022, 2 pages.
International Preliminary Report on Patentability for International Application No. PCT/US2020/051010, dated Mar. 15, 2022, 8 pages.
Extended European Search Report for European Application No. 20865039.0, dated Sep. 19, 2023, 6 pages.
Bloomfield, L.A., "Introduction to Viscoelastic Silicone Rubber," 2011, 2 pages, YouTube, Retrieved from the Internet: https://www.youtube.com/watch?v=Q1VtAXeMn74.

* cited by examiner

*Primary Examiner* — Nicole M. Buie-Hatcher
(74) *Attorney, Agent, or Firm* — RatnerPrestia (57) ABSTRACT

A non- or low-boron putty base includes a crosslinked reaction product of at least one polydiorganosiloxane that has at least two reactive functional groups and at least one crosslinker capable of reacting with the reactive functional groups to form the crosslinked reaction product. The putty base is dilatant and comprises 0 to 0.1 weight percent of a boron-containing compound. Dilatant putties made from the putty base and fillers are also provided. A method of making a dilatant putty includes: providing at least one polydiorganosiloxane comprising at least two reactive functional groups; providing an additive; providing at least one crosslinker capable of reacting with the reactive functional groups; and combining the polydiorganosiloxane, the filler, and the crosslinker to form the dilatant putty having less than 0.1 wt % boron.

17 Claims, 1 Drawing Sheet

PUTTY AND PUTTY BASE COMPOUNDS AND METHODS OF MAKING THEREOF

CROSS REFERENCE TO RELATED APPLICATIONS

This application claims the benefit of and priority from U.S. Provisional Application No. 62/901,331, filed on Sep. 17, 2019, the disclosure of which is incorporated by reference herein in its entirety for all purposes.

TECHNICAL FIELD

The present invention relates to silicone putties, silicone putty bases and methods of manufacture thereof.

BACKGROUND

Silicone putties have been available since the 1940's. They are incorporated in various items ranging from novelty toys such as Silly Putty® to functional items such as golf ball cores, physical therapy aids for hands, and shock-absorbing systems. These putties generally have a dilatant property. That is, under low shear rate and low shear conditions, or slow application of a low force they will flow slowly, i.e., exhibit what is referred to as "cold flow", undergoing a permanent deformation. For example, gravity will generally cause a mass of putty placed on a surface to slowly flow out in all directions at room temperature. Another example is if a putty is placed over a small hole, the putty will slowly flow through the hole over time. Conversely, when the shear rate is high and high forces are applied rapidly or force is applied rapidly, such as dropping a ball of the material, or rapidly elongating it, the putty will exhibit an elastic property, i.e., will bounce if dropped from a height without deforming permanently, or else exhibit brittle behavior, i.e., will snap cleanly into two pieces if elongated rapidly. The putty will also shatter if a sufficiently large mass of putty is dropped from a height of several stories.

As used herein the term, "putty base" refers to the material resulting from the crosslinking of an appropriate polydimethylsiloxane (PDMS) compound. In contrast, the term "putty" refers to a blend of putty base with various additives. Non-limiting examples of such additives are fillers (e.g. silica, clays, micas); colorants; fragrances; plasticizers; softeners; lubricants; polymers; and others.

One method of preparing silicone putty bases is the condensation reaction of hydroxy-terminated polydimethylsiloxanes (CAS 70131-67-8) with a reactive boron compound such as boric acid. Structurally, hydroxy-terminated polydimethylsiloxanes are polydimethylsiloxanes that have at least one hydroxy group at each end of the polymer chain. The hydroxy-terminated polydimethylsiloxanes may be referred to as "OH-terminated PDMS" or as "hydroxy-stopped PDMS"; "hydroxy-end blocked PDMS"; "silanol terminated PDMS"; "silanol end-blocked PDMS"; "silanol end-stopped PDMS"; "α,ω-silanol terminated PDMS"; or simply "OH-PDMS."

In an alternative method, several weight percent of a boron compound such as boric oxide or boric acid and optionally a Lewis acid such as $FeCl_3$ is heated >150° C. for several hours with an unfunctionalized polydimethylsiloxane (PDMS) such as a silicone oil or gum. Random cleavages of Si—O—Si bonds along the PDMS backbone result in —Si—O— fragments which then react with the boron compound forming —Si—O—B— linkages.

Common reactive boron compounds that may be used to effect this crosslinking reaction include, but are not limited to, boric oxide, boric acid, borate salts, borate esters, boroxines, and boronic acids. Each of these boron compounds can react with the terminal hydroxy groups of up to three OH-PDMS. Several weight percent of the boron compound is usually heated to above 100° C. together with an OH-PDMS. Heating the reaction mixture may not be required as the crosslinking reaction may also occur at room temperature, albeit slowly and without elimination of volatile byproducts from the reaction mixture.

During the crosslinking reaction with a boron compound, water or an alcohol is released through condensation of the reactive groups (e.g., —OH or —OR, depending on the particular boron compound) with the OH of the OH-PDMS. If the reaction mixture is heated, the volatile condensation product is driven from the putty base. If the reaction is performed at room temperature, much of the volatile reaction products, such as water or alcohol, remain trapped within the putty base. These trapped volatiles tend to result in less desirable physical properties such as an increase in tackiness. The crosslinked putty base may initially be a stiff, viscoelastic gel-like material which may be kneaded to take on the final desired properties of a putty base. The kneaded putty base exhibits varying degrees of cold flow (permanent flow over time when placed on a surface as described above), bounce, and elasticity. These properties depend on the initial weight averaged molecular weight of the OH-PDMS (prior to crosslinking) and the relative amount of crosslinker used to effect the condensation reaction. Importantly, the putty base and the final putty also generally exhibit the dilatant non-Newtonian behavior that Silly Putty® is known for: low apparent viscosity at low shear rate and higher apparent viscosity under higher shear rates. The putty and the putty base both undergo permanent deformation, stretching and flowing under low shear stresses and low shear rate while shattering or bouncing without undergoing permanent deformation under high stress and high shear rate.

Several boron compounds including boric acid, boric oxide, and sodium borate are currently under regulatory scrutiny in the European Union and classified as reproductive toxins. They are listed as Substances of Very High Concern (SVHC) under the EU Registration, Evaluation, and Authorization of Chemicals (REACH) regulation (EC Regulation No. 1907/2006). One consequence of SVHC listing is that SVHCs may not be included in products imported and sold in the EU at levels above 0.1 wt. % (1000 ppm) without triggering supplier notification obligations directed toward its safe use by downstream users. The common boron compounds used as crosslinkers to make silicone bouncing putties are SVHCs and are all incorporated at levels well above 0.1 wt. %. The use of these SVHCs may be restricted in the future to only uses authorized by the European Chemicals Agency (ECHA). In addition, many retailers in the EU, as a matter of policy, will not sell products containing SVHCs above the 0.1 wt. % threshold. Therefore, the SVHC restriction related to silicone putties impacts how boron-containing bouncing putties are sold in the EU.

The Toy Safety Directive (which is a regulation independent of REACH) imposes a limit on the amount of soluble boron in a children's toy to no more than 1200 ppm.

Accordingly, there is a need for a putty and/or putty base having a low concentration of boron (or none). In particular, there is a need for non-boron crosslinked silicone putties that are compliant with EU regulatory requirements of both REACH and the Toy Safety Directive 2008/48/EU.

SUMMARY OF THE INVENTION

In one embodiment, a non- or low-boron putty base that is a crosslinked reaction product of at least one polydiorganosiloxane and at least one crosslinker capable of reacting with the reactive functional groups to form the crosslinked reaction product is provided. The polydiorganosiloxane has at least two reactive functional groups. The putty base is dilatant and comprises 0 to 0.1 weight percent of a boron-containing compound.

In another embodiment, a method of making a non- or low-boron putty base that is dilatant is provided. The steps of the method of making the putty base include providing at least one polydiorganosiloxane that has at least two reactive functional groups as well as providing a crosslinker that is capable of reacting with the at least two reactive functional groups and mixing the polydiorganosiloxane and the crosslinker to form a reaction mixture, so that the crosslinker reacts with the reactive functional groups to form the putty base. The resulting putty base has 0 to 0.1 wt. % of a boron containing compound.

In another embodiment, a method of making a dilatant putty that has 0 to 0.1 wt. % of a boron containing compound is provided. The first steps of the method are providing at least one polydiorganosiloxane that has at least two reactive functional groups, optionally providing at least one additive, and providing at least one crosslinker that is capable of reacting with the reactive functional groups. The polydiorganosiloxane, the crosslinker, and the optional at least one additive are all combined to form a reaction mixture in which the crosslinker reacts with the reactive functional groups to form the putty.

In yet another embodiment, a method of making a non- or low-boron putty that is dilatant is provided. The steps of the method of making the putty include providing at least one polydiorganosiloxane that has at least two reactive functional groups as well as providing a crosslinker that is capable of reacting with the at least two reactive functional groups and mixing the polydiorganosiloxane and the crosslinker to form a reaction mixture, so that the crosslinker reacts with the reactive functional groups to form a putty base. At least one additive is provided and blended with the putty base to form a putty. The resulting putty has 0 to 0.1 wt. % of a boron containing compound.

DETAILED DESCRIPTION OF PARTICULAR EMBODIMENTS

Figure 1:
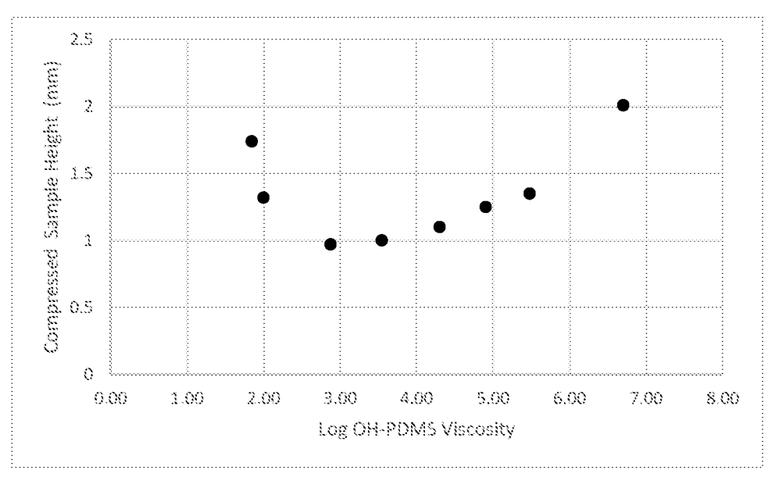
The FIGURE shows plasticity (compressed sample height) in mm vs log of OH-PDMS viscosity for putty bases according to certain embodiments of the invention.

The present invention achieves the preparation of non- or low-boron crosslinked silicone putties that are compliant with EU regulatory requirements of both REACH and the Toy Safety Directive 2008/48/EU. The putties prepared according to the present invention comprise from 0 to 0.1 weight percent of boron-containing compounds.

Non-Boron Crosslinkers for Polydiorganosiloxanes Comprising at Least Two Reactive Groups:

The inventor has discovered that compounds of aluminum (III), titanium(IV), zirconium(IV), and/or hafnium(IV) can replace boron-based crosslinkers in their entirety to afford putty-like crosslinked OH-PDMS compounds. Instead of forming a polymer network with boron-oxygen-silicon linkages, these non-boron crosslinkers afford aluminum-oxygen-silicon, titanium-oxygen-silicon, zirconium-oxygen-silicon, and/or hafnium-oxygen-silicon bonds according to some embodiments. The crosslinked products obtained from these non-boron crosslinkers have properties that are markedly different from those obtained from, for example, the crosslinking of an OH-PDMS with a triacetoxysilane to form a room temperature vulcanizable (RTV) rubber. The non-boron crosslinked products do not, for example, return to an equilibrium shape when distorted (e.g., stretched or squeezed) as is the case for an RTV rubber. The rheological behavior of the non-boron crosslinked products disclosed herein may be similar to that of boron-crosslinked products such as Silly Putty®. Non-boron crosslinkers include but are not limited to titanium alkoxides, such as titanium isopropoxide, titanium butoxide, titanium methoxide, titanium ethoxide, titanium 2-ethylhexyloxide, and titanium propoxide; chelated titanium alkoxides such as titanium dibutoxide (bis-acetylacetonate), titanium dibutoxide(bis-ethyl acetoacetate), titanium diisobutoxide(bis-ethyl acetoacetate), titanium diisopropoxide(bis-acetylacetonate), titanium diisopropoxide(bis-ethyl acetoacetate); titanium trimethylsiloxide, polydibutyltitanate, and diethoxysiloxane-ethyltitanate copolymer); aluminum alkoxides, such as aluminum propoxide, aluminum isopropoxide, aluminum butoxide, aluminum methoxide, and aluminum ethoxide and diethoxysiloxane-butylaluminate copolymer); aluminum chelates such as aluminum acetylacetonate; zirconium alkoxides such as zirconium methoxide, zirconium ethoxide, zirconium n-propoxide, zirconium isopropoxide, and zirconium n-butoxide and mixtures thereof. Chelated zirconium alkoxide compounds such as zirconium dipropoxide(bis-diethylcitrate) and zirconium dibutoxide(bis-acetylacetonate) may also be used to crosslink the crosslinkable polydimethylsiloxanes. Hafnium alkoxides and chelated hafnium alkoxides are also suitable crosslinkers. Examples of suitable hafnium compounds include but are not limited to hafnium methoxide, hafnium ethoxide, hafnium propoxide, hafnium isopropoxide, hafnium butoxide, hafnium t-butoxide, and hafnium 2-ethylhexyloxide. Chelated hafnium compounds such as hafnium dibutoxide(bis-acetylacetonate) are also suitable crosslinkers for OH-PDMS. Several of the disclosed titanium and zirconium compounds are commercially available under the Tyzor® brand of organic titanate and zirconate crosslinkers from Dorf-Ketal. Other suitable titanium and zirconium compounds are commercially available under the Ken-React® brand from Kenrich Petrochemicals.

In some embodiments, the disclosed titanium, aluminum, zirconium, and hafnium compounds crosslink hydroxy-terminated PDMS to provide putty bases with different physical properties. Depending on the crosslinker, the dilatant putty bases may exhibit varying degrees of shear thickening, self-cohesion, and self-healing properties.

The crosslinking reaction generally proceeds at both room and elevated temperatures, with the reaction rate increasing with increasing temperature. Alcohols are released as byproducts of the reaction. For example, aluminum isopropoxide may react with up to three terminal OH groups on OH-PDMS releasing isopropanol in the process. Elimination of the isopropanol byproduct may be accomplished through heating the reaction mixture. If the reaction is performed at room temperature, the alcohol may slowly diffuse over time out of the crosslinked polymer matrix.

Surprisingly, chelated titanium alkoxide complexes, such as titanium diisobutoxide(bis-ethyl acetoacetate), commercially available as Tyzor® IBAY, and titanium diisopropoxide(bis-acetylacetonate), commercially available as Tyzor® GBA, each may react with two OH-terminated PDMS with loss of two molecules of an alcohol to afford dilatant putty bases. As disclosed herein, the dilatant behavior of putty bases prepared from difunctional complexes may be substantially similar to putty bases prepared from trifunctional boric acid and derivatives.

It was initially believed that titanium isopropoxide, commercially available as Tyzor® TPT, with four isopropoxy groups, and titanium 2-ethylhexyloxide, commercially available as Tyzor® TOT, would react using all four alkoxy groups. Experimentally, it has been found that putty bases made using either titanium 2-ethylhexyloxide or titanium isopropoxide result from the reaction of only two alkoxide groups. In further embodiments of the titanium compound reaction, as Lewis acids, the crosslinking Ti species may form labile coordination complexes with a lone pair of electrons on one or more oxygen atoms in the Si—O—Si polymer backbone of another OH-PDMS chain as a different type of (e.g., non-covalent) crosslink, according to aspects of the non-boron cross-linking technology.

Aluminum Compounds as Crosslinkers:

In further embodiments, aluminum isopropoxide [Al(i-OPr)$_3$] is reacted with all OH-PDMS grades at both room and elevated (>80° C.) temperature to afford highly viscous, sticky, and elastic compounds that exhibit increased cold flow relative to a boron-compound crosslinked putty base. In addition, at loadings of 2 weight percent or more, aluminum isopropoxide crosslinking resulted in lumpy non-cohesive gels which exhibited no cold flow, thereby demonstrating an approximate upper limit of such non-boron cross-linking compounds.

In some aspects, aluminum isopropoxide may be more reactive than boron crosslinkers as evidenced by the relatively rapid room temperature crosslinking observed for Al(i-OPr)$_3$ whereas boric acid and borate salts may react over a period of a few hours at room temperature. In further aspects, Al(i-OPr)$_3$ may be shown to react within a few minutes at room temperature to afford tacky gels which are somewhat elastic and exhibit a high degree of cold flow. However, the compounds crosslinked with aluminum isopropoxide may not bounce like boron- or titanium-crosslinked OH-PDMS, and heating the reaction may not reduce the tacky feel of the gels, according to some embodiments. Heating for longer periods of time may result in the formation of a lumpy, non-cohesive gel, and a similar non-cohesive gel may result when more than 2 weight percent of aluminum isopropoxide is used. Accordingly, the use of aluminum compounds as an alternative to boron-compound crosslinkers in putty bases may require additional attention to the room temperature elasticity, cold flow properties, and the desired putty feel.

In some aspects, aluminum complexes with chelating ligands such as aluminum acetylacetonate [Al(acac)$_3$] may be more stable and less reactive than non-chelated complexes. For example, in contrast to the moderate moisture sensitivity and reactivity of aluminum isopropoxide, Al(acac)$_3$ is stable to moisture for extended periods and reacts over a longer period of time with a crosslinkable polydiorganosiloxanes. Additionally, the putty bases resulting from crosslinking with Al(acac)$_3$ may be somewhat less tacky than those obtained using aluminum isopropoxide, thereby indicating the more desired application of aluminum acetylacetonate. In further aspects, flowable putty-like gelled materials may be the only products of crosslinking with Al(acac)$_3$ regardless of the amount of the crosslinker, and the lumpy, non-cohesive gels that resulted from more than 2 weight % aluminum isopropoxide may not be observed with Al(acac)$_3$.

In some embodiments, the aluminum acetylacetonate reaction with a crosslinkable polydiorganosiloxanes provides a nonobvious outcome, since the hexacoordinate compound appears to lack any labile ligands such as alkoxy groups, and since chelated ligands are usually difficult to remove except under forcing conditions (e.g., high temperature). However, in some embodiments, analysis of the reaction products using a gas chromatograph-mass spectrometer (GCMS) indicate the presence of free acetylacetone, which is not present in the starting crosslinker aluminum acetylacetonate, Al(acac)$_3$. Accordingly, in some embodiments, the presence of free acetylacetone indicates that at least two coordination sites on the aluminum atom have opened up and can serve as reaction sites for OH-PDMS.

Non-limiting examples of suitable aluminum compounds that may be used for crosslinking the crosslinkable polydiorganosiloxanes that comprise at least two reactive groups capable of participating in a condensation reaction are: aluminum propoxide, aluminum isopropoxide, aluminum butoxide, aluminum methoxide, aluminum ethoxide diethoxysiloxane-butylaluminate copolymer, aluminum acetylacetonate, triethanolamine aluminate (e.g., alumatrane), and mixtures thereof. The aluminum analog of boric acid, aluminum hydroxide, is unreactive in the presence of OH-PDMS even at high (>150° C.) temperature.

Titanium Compounds as Crosslinkers:

As discussed above, titanium compounds may be used to crosslink the crosslinkable polydiorganosiloxanes that comprise at least two reactive groups capable of participating in a condensation reaction, with such titanium compounds serving as an alternative to boron-containing components. Non-limiting examples of suitable titanium compounds are: titanium alkoxides, chelated titanium isopropoxide, titanium butoxide, titanium methoxide, titanium ethoxide, titanium 2-ethylhexyloxide, titanium propoxide, titanium dibutoxide (bis-acetylacetonate), titanium dibutoxide(bis-ethyl acetoacetate), titanium diisobutoxide(bis-ethyl acetoacetate), titanium diisopropoxide(bis-acetylacetonate), titanium diisopropoxide(bis-ethyl acetoacetate), titanium trimethylsiloxide, polydibutyltitanate, diethoxysiloxane-ethyltitanate copolymer, titanium bis(triethanolamine) diisopropoxide, and mixtures thereof. Titanium compounds such as titanium isopropoxide(triethanolamine) and titanium acetylacetonate do not crosslink OH-PDMS.

Zirconium Compounds as Crosslinkers:

Zirconium compounds may also be used to crosslink the crosslinkable polydimethylsiloxanes. Non-limiting examples of suitable zirconium compounds are zirconium alkoxides such as zirconium methoxide, zirconium ethoxide, zirconium n-propoxide, zirconium isopropoxide, and zirconium n-butoxide. Chelated zirconium alkoxide compounds such as zirconium dipropoxide(bis-diethylcitrate) and zirconium dibutoxide(bis-acetylacetonate) may also be used to crosslink the crosslinkable polydimethylsiloxanes. Like the titanium crosslinkers, zirconium compounds which lack two or more alkoxides such as zirconium acetylacetonate, Tyzor® 212 (a zirconium alkanolamine chelate commercially available from Dorf-Ketal), and tetrakis(triethanolaminato)zirconium may not crosslink the crosslinkable polydimethylsiloxanes.

Hafnium Compounds as Crosslinkers:

Compounds of a third Group IV transition metal, hafnium, may also be used to crosslink the crosslinkable polydimethylsiloxanes. Non-limiting examples of suitable hafnium compounds are hafnium alkoxides such as hafnium methoxide, hafnium ethoxide, hafnium propoxide, hafnium isopropoxide, hafnium butoxide, hafnium tert-butoxide, and hafnium 2-ethylhexyloxide. In addition, chelated hafnium alkoxides such as hafnium dibutoxide(bis-acetylacetonate) also crosslink the crosslinkable polydimethylsiloxanes.

Crosslinkable Polydiorganosiloxanes:

The crosslinkable polydimethylsiloxanes may be differentiated based on their viscosity, molecular weight, and reactive group content. All molecular weights (MW) referred to herein are understood to be weight average molecular weights, expressed in Daltons.

In some embodiments of the putty, the crosslinkable polydiorganosiloxanes may have at least two reactive groups, typically at least two hydroxy groups, which preferably, but not necessarily, are located one at each terminus. However, other reactive moieties are envisaged. In addition the polydiorganosiloxanes may be linear or branched. In particular, polydimethylsiloxanes having terminal OH groups, also referred to herein as OH-PDMS, are typically employed as the crosslinkable compound. The weight average molecular weight of the crosslinkable PDMS having at least two reactive groups may be about 500 Da or higher, such as up to about 3,000,000 Da. For example, the weight average molecular weight of the crosslinkable PDMS having at least two reactive group may be 550 Da, 600 Da, 650 Da, 700 Da, 750 Da 800 Da, 850 Da, 900 Da, 1000 Da, 1200 Da, 1400 Da, 1600 Da, 1800 Da, 2000 Da, 2200 Da, 2400 Da, 2600 Da, 2800 Da, 3000 Da, 3200 Da, 3400 Da, 3600 Da, 3800 Da, 4000 Da, 4200 Da, 4600 Da, 4800 Da, 5000 Da, 5500 Da, 6500 Da, 7000 Da, 7500 Da, 8000 Da, 8500 Da, 9000 Da, 10,000 Da, 15,000 Da, 20,000 Da, 25,000 Da, 30,000 Da, 35,000 Da, 40,000 Da, 45,000 Da, 50,000 Da, 65,000 Da, 70,000 Da, 75,000 Da, 80,000 Da, 85,000 Da, 90,000 Da, 95,000 Da, 100,000 Da, 150,000 Da, 200,000 Da, 250,000 Da, 300,000 Da, 350,000 Da, 400,000 Da, 450,000 Da, 500,000 Da, 650,000 Da, 700,000 Da, 750,000 Da, 800,000 Da, 850,000 Da, 900,000 Da, 950,000 Da, 1,000,000 Da, 1,500,000 Da, 2,000,000 Da, 2,500,000 Da, or 3,000,000 Da. In some embodiments, the molecular weight may fall within any range encompassed by any pair of these molecular weights, or may be a mixture of various molecular weights, as is typical for polymeric materials. The weight average molecular weight of the crosslinkable PDMS may be from 550-3,000,000 Da; 5000-1,000,000 Da; 5000-300,000 Da, 7000-150,000 Da, 550-50,000 Da, or 2500-50,000 Da as measured using gel permeation chromatography with polystyrene standards.

The viscosity of the crosslinkable PDMS having at least two reactive moieties may likewise range from about 25 cP, or 30 cP, or 40 cP, or 50 cP, or 60 cP, or 70 cP, or 80 cP, or 90 cP, or 100 cP to 300,000 cP or higher, such as about 200 cP, 300 cP, 400 cP, 500 cP, 600 cP, 700 cP, 750 cP, 1000 cP, 1500 cP, 1600 cP, 1800 cP, 2000 cP, 2200 cP, 2400 cP, 2600 cP, 2800 cP, 3000 cP, 3200 cP, 3400 cP, 3600 cP, 3800 cP, 4000 cP, 4200 cP, 4600 cP, 4800 cP, 5000 cP, 5500 cP, 6500 cP, 7000 cP, 7500 cP, 8000 cP, 8500 cP, 9000 cP, 10,000 cP, 15,000 cP, 20,000 cP, 25,000 cP, 30,000 cP, 35,000 cP, 40,000 cP, 45,000 cP, 50,000 cP, 65,000 cP, 70,000 cP, 75,000 cP, 80,000 cP, 85,000 cP, 90,000 cP, 95,000 cP, 100,000 cP, 150,000 cP, 200,000 cP, 250,000 cP, 300,000 cP, 350,000 cP, or 400,000 cP, or 450,000 cP, or 500,000 cP, or 550,000 cP, or 600,000 cP, or 650,000 cP, or 700,000 cP, or 750,000 cP, or 800,000 cP, or 850000 cP, or 900,000 cP, or 950,000 cP, or 1,000,000 cP, or 5,000,000 cP, or 10,000,000 cP. In further aspects, the viscosity may fall within any range encompassed by any pair of these viscosities. For example, the viscosity may be from 25-10,000,000 cP; 40-100,000 cP; 70-20,000 cP; or 100 to 3500 cP. The kinematic viscosity in centistokes (cSt) of crosslinkable PDMS up to about 100,000 cSt (e.g., about 100,000 cP) may be measured at 25° C. using a Cannon-Fenske tube viscometer employing tube sizes from 150 to 700 according to the procedure in ASTM standard D445-19a Standard Test Method for Kinematic Viscosity of Transparent and Opaque Liquids (and Calculation of Dynamic Viscosity). Alternatively, dynamic viscosity (cP) up to about 10,000,000 cP may be measured directly at 25° C. using the appropriate model of Brookfield viscometer (e.g., LV, RV, HV, HB) and a range of spindles at 60 rpm.

The hydroxy content, expressed as wt. %, of the crosslinkable PDMS having at least two hydroxy groups per molecule may be about 0.005 wt. %, or 0.01 wt. %, or 0.02 wt. %, or 0.04 wt. %, or 0.08 wt. %, or 0.10 wt. %, or 0.15 wt. %, or 0.20 wt. %, or 0.40 wt. % or 0.80 wt. %, or 1.0 wt. %, or 1.2 wt. %, or 1.5 wt. %, or 2 wt. %, or 2.5 wt. %, or 3.0 wt. %, or 3.5 wt. %, or 4.0 wt. %, or 5.0 wt. %, or 6.0 wt. %, or 7.0 wt. % or 8.0 wt. %, or 9.0 wt. %, or 10.0 wt. %. In further aspects, the hydroxyl content may fall within any range encompassed by any pair of wt. % hydroxy values. For example the hydroxy content may be between 0.01 and 10 wt %; 0.02 and 5 wt %; 0.05 and 2 wt % or 0.08 and 1.25 wt %. Hydroxy group content, expressed as wt %, may be derived from the hydroxyl value (expressed as mg KOH/g polymer) which may be measured directly using ASTM test method E222-17 Standard Test Methods for Hydroxyl Groups Using Acetic Anhydride Acetylation.

Linear hydroxy-terminated polydimethylsiloxanes are commercially available from numerous manufacturers and distributors such as Sigma-Aldrich, Gelest, AB Silicones, Blue Star Silicones, and Dow Corning in a variety of viscosity/molecular weight grades, from low viscosity fluids of at least 25 cP to gums with viscosities as high as a 1,000,000 cP or more. Some typical OH-PDMS grades are listed in Table 1. Note that the relative OH content, expressed as weight percent of the polymer, decreases as molecular weight, expressed as weight average molecular weight increases. Conversely, the relative OH content increases as molecular weight of the polymer decreases. The implications of this are that low molecular weight/high OH content OH-PDMS may require more (or significantly more) crosslinker to react with all or substantially all of the OH groups than would be used with a high molecular weight/low OH content polymer. Further, the crosslink density of the lower molecular weight OH-PDMS will necessarily be higher, if all, or nearly all of the terminal OH groups are reacted.

TABLE 1

Viscosity, approximate weight percent hydroxy group and weight average molecular weight of selected hydroxy-terminated PDMS from manufacturer data

| Viscosity (cP) | Approx. Wt. % OH | Approx, molecular weight, Daltons |
|---|---|---|
| 25 | 6 | 550 |
| 40 | 3.8 | 850 |
| 70 | 1.25 | 2700 |
| 100 | 0.85 | 4200 |

TABLE 1-continued

Viscosity, approximate weight percent hydroxy group
and weight average molecular weight of selected
hydroxy-terminated PDMS from manufacturer data

| Viscosity (cP) | Approx. Wt. % OH | Approx. molecular weight, Daltons |
|---|---|---|
| 750 | 0.20 | 20,000 |
| 3500 | 0.08 | 43,500 |
| 20,000 | 0.04 | 77,000 |
| 80,000 | 0.02 | 123,000 |
| 135,000 | 0.02 | 139,000 |
| 300,000 | 0.01 | 150,000 |

As will be described below, very low viscosity (below 70 cP) OH-PDMS fluids may result in more brittle and inelastic putty bases after crosslinking, in contrast to the higher viscosity (70 cP and higher) OH-PDMS grades. Crosslinking of higher viscosity/molecular weight OH-PDMS (>20,000 cP) tends to result in putties having less desirable properties (e.g., the putty base may tend to gradually pull apart into irregularly shaped pieces instead of snap cleanly when suddenly pulled). The OH-PDMS viscosity may range from about 25 cP to about 300,000 cP, or from about 40 cP to about 20,000 cP, or from about 70 cP to about 3500 cP.

Embodiments of the crosslinkable polydiorganosiloxanes are not limited to only hydroxy-terminated polydimethylsiloxanes. Any polydiorganosiloxane with at least two crosslinkable (reactive) groups per molecule, such as a hydroxy group, located at terminal or medial positions or combinations of both, can be crosslinked to afford putty bases. These crosslinkable polydiorganosiloxanes may be linear or branched. The backbone of the polydiorganosiloxanes may include various silicon substituents. Representative polydiorganosiloxanes include those whose silicon substituents may be alkyl, vinyl, phenyl, aryl, haloalkyl, etc., or combinations of each, for example, hydroxy-terminated polydimethyldiphenylsiloxane. The crosslinkable hydroxy-terminated polydimethyldiphenylsiloxanes may be linear or branched.

The reactive groups may not be limited to hydroxy groups. Moisture sensitive functional groups which can undergo hydrolysis to form a hydroxy-terminated polydimethylsiloxane, such as halo, alkoxy, acyloxy, dialkylamino, etc., have been found to react with non-boron crosslinkers under anhydrous conditions. For example, functional groups such as methoxy and acetoxy exhibit reactivity toward select non-boron crosslinkers. Zirconium n-propoxide (30 wt % of 70 wt. % solution in n-propanol, Sigma-Aldrich) was found to react at 150° C. in 2 hours with a methoxy-terminated polydimethylsiloxane (950 Da, DMS-XM11, Gelest Inc.) to afford a soft, tacky gel which behaved similarly to other zirconium-crosslinked putty bases. The reaction was carried out under a blanket of dry nitrogen to inhibit hydrolysis of the methoxy group by atmospheric moisture. In addition, the presence of very water-reactive zirconium n-propoxide served to ensure that no water was present to hydrolyze the methoxy group.

Diacetoxy-terminated (e.g., two acetoxy groups at each terminus for a total of four acetoxy groups per molecule) polydimethylsiloxane (36,000 Da, DMS-D33, Gelest Inc.) was found to react with 5 wt. % titanium isopropoxide under a blanket of nitrogen after several hours at 150° C. A rubbery elastic gel resulted which exhibited no cold flow. A crosslinked gel was also observed to form when 5 wt. % of a 70 wt. % solution of zirconium n-propoxide in n-propanol was reacted with the diacetoxy-terminated polydimethylsiloxane at 120° C. for 1 hour. In addition, intentional hydrolysis of the acetoxy groups was carried out prior to crosslinking resulting in a dihydroxy-terminated (e.g., two hydroxy groups on at each terminus for a total of four hydroxy groups per molecule) polydimethylsiloxane. Crosslinking this tetrafunctional polymer with Tyzor® GBA resulted in the formation of a very stiff putty base with no cold flow. The physical characteristics of this crosslinked putty base were consistent with a polymer with very high crosslink density.

For comparison, 10 wt. % boric acid was reacted with the above methoxy-terminated polydimethylsiloxane under nitrogen in a sealed glass vial to exclude moisture. At room temperature no gelation or increase in viscosity occurred, even after standing overnight. Heating the mixture instead at 80° C. likewise did not result in the formation of a gel, although a very slight increase in viscosity was noted along with a small amount of condensation within the vial after a few hours. When the reaction was instead heated at 120° C., a soft elastic gel resulted within 3 hours. A white solid appeared on the vial walls instead of a condensate; infrared spectroscopy indicated that the white solid was boric acid. Infrared spectroscopy also indicated that the gel was a mixture of a low molecular weight OH-PDMS and boric acid-crosslinked OH-PDMS. A silanol SiO—H vibration was observed at 3177 cm$^{-1}$, a silanol Si—OH vibration at 896 cm$^{-1}$, and a SiO—B vibration typical for boron-crosslinked putties was observed at 1335 cm$^{-1}$.

Without wishing to be bound by theory, it may be that at reaction temperatures above 100° C., dehydration of boric acid to metaboric acid takes place. The liberated water may then hydrolyze a portion of the methoxy-terminated PDMS to a hydroxy-terminated PDMS and methanol. This hypothesis is supported by spectroscopic evidence for the presence of an OH-PDMS in the reaction mixture which in turn may react with the metaboric acid and/or any remaining boric acid releasing more water in the process. At the same time, trimethylborate (b.p. 69° C.) is forming (confirmed by GCMS) from the reaction of released methanol with boric acid which subsequently condenses on the walls of the vial and hydrolyzes to boric acid. In contrast to the apparent lack of room temperature reactivity with a methoxy-terminated PDMS, boric acid reacts after several hours at room temperature with a variety of hydroxy-terminated polydimethylsiloxanes to afford crosslinked putty bases.

While under certain reaction conditions, crosslinked PDMS may result from the reaction of alkoxy and/or diacetoxy-terminated PDMS with different non-boron crosslinkers, the high cost and moisture-sensitivity of such substituted PDMS renders their use to prepare silicone putties impractical. In contrast, hydroxy-terminated polydimethylsiloxanes are readily available, relatively inexpensive, easy to handle, and are the preferred crosslinkable polydimethylsiloxanes for the preparation of dilatant putties using non-boron crosslinkers as disclosed herein.

Non-hydrolyzable terminated polydimethylsiloxanes such as hydroxyethoxypropyl-terminated polydimethylsiloxane (Dowsil® 5562 Carbinol Fluid) and diglycidyl ether-terminated polydimethylsiloxane (800 Da, Sigma-Aldrich) reacted with aluminum isopropoxide to afford gels. Aluminum isopropoxide (15 wt. %) reacted with Dowsil 5562 at 120° C. to afford a friable polymer which could not be kneaded or easily compressed into a putty base, as did titanium diisopropoxide bis(acetylacetonate). Similarly, aluminum isopropoxide (15 wt. %) reacted with diglycidyl ether-terminated PDMS at 120° C. to afford a crosslinked gel; it is believed that ring opening of the epoxide occurred as evidenced by the disappearance of the peak at 911 cm$^{-1}$ (tentatively assigned to the asymmetric epoxide ring deformation) in the infrared spectrum of the product.

Other Additives:

In further embodiments, blending various fillers and additives such as silica or calcium carbonate with the non-boron crosslinked putty bases described herein results in the formation of putties. The fillers may be blended into the crosslinked putty base directly, or may be mixed with the OH-PDMS fluid prior to or even during the crosslinking reaction. Similarly, other additives and combinations of additives, such as plasticizers and softening agents; other polymeric materials; pigments, dyes and other colorants; glitter; and fragrances may be blended into the putty base or may be present during the crosslinking reaction, while maintaining a non- or low-boron putty. Non-limiting examples of such additives include: fillers such silica, fumed silica, clays, micas, quartz, calcium carbonate, barium sulfate, pumice, microspheres, starches, lubricating oils, waxes, polydimethylsiloxane oils and gums, polyisobutylene rubbers, glycerin, density-reducing fillers (e.g., hollow microspheres), fragrances, colorants, and mixtures thereof. Typical loading levels of these fillers may range from 0.001 wt. % to 70 wt. %. Embodiments of suitable plasticizers and/or softening agents include glycerin and lubricating oil, as well as silicone oils and gums, waxes, long-chain (i.e. "fatty") acids, fatty amides, fatty alcohols, and fatty esters as well as phthalate, isophthalate and other diester plasticizers, for example adipates and sebacates. Glitter may be added as well. Typically glitter comprises small particles of metalized polyester film. Non-limiting examples of pigments, dyes and other colorants include: inorganic pigments such as metal powders (i.e., aluminum), carbon blacks, titanium dioxide, zinc oxide, lakes, and those based on iron oxide; organic pigments such as azo, diarylide, naphthol, and phthalo pigments; acid dyes, basic dyes, solvent dyes, direct dyes, reactive dyes, and leucodyes (including thermochromic and photochromic dyes).

According to some aspects, abrasive agents may be added to the putty base. These abrasive agents may added instead of or in addition to the other additives as disclosed herein. According to certain aspects of the invention, the putty comprising the abrasive agent(s) may be used as an eraser for marks made on a substrate, such as paper, with a pencil, pen or marker for example. Abrasive agents are used to increase the coefficient of friction between the surface to be erased and the eraser resulting from the inventive putty comprising the abrasive agent, thereby physically removing markings, such as, pencil markings from the surface to be erased by mechanically wearing away the graphite particles from the paper surface. Suitable examples of abrasive agent include, but are not limited to, pumice, calcium carbonate, bentonite clay, carborundum, emery, quartz powder, glass powder, alumina, zirconia, and silica (sand). The abrasive agent may be present, in the putty, in any suitable amount, such as, from about 5 wt. % to about 70 wt. %, or about 20 15 wt. % to about 65 wt. %, or about 20 wt. % to about 55 wt. %, based on the total weight of the putty. In an embodiment, pumice may be present in an amount from 5-20 wt. %, based on the total weight of the putty. In another embodiment, calcium carbonate may be present, in the putty, in any suitable amount, such as, in an amount from 10-50 wt. %, based on the total weight of the putty.

Fragrances may also be added as are known and used in the art. Fragrance mixtures suitable for use in silicone putties may be obtained from Horizon Aromatics.

Crosslinking Reactions:

In embodiments of the invention, a general procedure for crosslinking crosslinkable polysiloxanes, such as a hydroxy-terminated polydimethylsiloxane, comprises vigorously mixing a stoichiometric or near-stoichiometric quantity of the non-boron crosslinker with an OH-PDMS followed optionally by heating to remove volatile reaction byproducts and/or solvents. Given the large molecular weight difference between the crosslinkers and the OH-PDMS polymers, a large relative volume of OH-PDMS is always present and may serve as both reactant and solvent. A suitable co-solvent such as hexane may be used to further reduce the viscosity of the initial reaction mixture if desired.

In some aspects, the crosslinker level may be dependent on the OH content of the OH-PDMS, with less crosslinker required as OH-PDMS molecular weight increases and OH content decreases. Crosslinker loading may be varied from less than 0.1 wt. % to >50 wt. % based on the OH content of the hydroxy-terminated polydimethylsiloxane. In all examples, the approximate wt. % OH, viscosity, and average molecular weight of the OH-PDMS cited herein were obtained from information supplied by the manufacturer. The wt. % crosslinker used in each example is not the exact stoichiometric amount but a close approximation based on the information provided by the OH-PDMS manufacturer and the derived hydroxyl equivalent weight (e.g., OH eq. wt.=polymer molecular weight divided by the functionality of the polymer). Alternatively, exact OH content, viscosity, and molecular weight may be determined experimentally by any suitable means. A more exact value for hydroxyl equivalent weight may therefore be derived directly from the measured wt % OH for each OH-PDMS.

It has been found that the exact amount of crosslinker is not critical although excessive levels of crosslinker may result in an undesirably sticky putty base or putty, and in some cases, highly colored putty bases or putties. Similarly, too little crosslinker may result in viscous mixtures of partially crosslinked putty and uncrosslinked OH-PDMS. In cases where the crosslinker is provided as a solution, such as Tyzor® GBA or Tyzor® NPZ, the quantity of crosslinker is adjusted to account for the presence of solvent. All Ti, Zr, and Hf crosslinkers were found to react as difunctional crosslinkers regardless of the number of alkoxy substituents. Adding a slight excess (e.g., two-fold excess) of crosslinker did not appreciably affect the properties of the resulting putty base. The amount of titanium, zirconium, and hafnium crosslinker required for approximate stoichiometric reaction with selected hydroxy-terminated polydimethylsiloxanes is given in Tables 2 and 3.

TABLE 2

Approximate amounts of Tyzor ® titanium crosslinkers required to form a putty base with selected hydroxy-terminated polydimethylsiloxanes:

| OH-PDMS Viscosity (cP) | Approx. wt. % OH | Approx. MW OH-PDMS (Da) | OH eq. wt. (MW/2) (Da) | Wt. % GBA (as 75% sol'n) | Wt. % IBAY | Wt. % TOT | Wt. % TPT |
|---|---|---|---|---|---|---|---|
| Crosslinker MW (Daltons) | — | — | — | 364.25 | 452.37 | 564.75 | 284.22 |
| 40 | 3.8 | 850 | 425 | 57 | 53.1 | 66.29 | 33.36 |
| 70 | 1.25 | 2750 | 1375 | 17.67 | 16.45 | 20.54 | 10.34 |

TABLE 2-continued

Approximate amounts of Tyzor ® titanium crosslinkers required to form a putty base with selected hydroxy-terminated polydimethylsiloxanes:

| OH-PDMS Viscosity (cP) | Approx. wt. % OH | Approx. MW OH-PDMS (Da) | OH eq. wt. (MW/2) (Da) | Wt. % GBA (as 75% sol'n) | Wt. % IBAY | Wt. % TOT | Wt. % TPT |
|---|---|---|---|---|---|---|---|
| 100 | 0.85 | 4200 | 2100 | 11.56 | 10.77 | 13.45 | 6.77 |
| 750 | 0.2 | 18000 | 9000 | 2.69 | 2.51 | 3.14 | 1.58 |
| 3500 | 0.08 | 43500 | 21750 | 1.12 | 1.04 | 1.30 | 0.65 |
| 20000 | 0.04 | 77000 | 38500 | 0.63 | 0.59 | 0.73 | 0.37 |
| 80000 | 0.02 | 123000 | 61500 | 0.39 | 0.37 | 0.46 | 0.23 |

TABLE 3

Approximate amounts of zirconium and hafnium crosslinkers required to form a putty base with selected hydroxy-terminated polydimethylsiloxanes:

| OH-PDMS Viscosity (cP) | Approx. wt. % OH | Approx. MW OH-PDMS (Da) | OH eq. wt. (MW/2) (Da) | Wt % NPZ, 70% sol'n | Wt % Zr chelate* 75% sol'n | Wt % Hf butoxide, 45% sol'n | Wt % Hf chelate*, 50% sol'n |
|---|---|---|---|---|---|---|---|
| Crosslinker MW (g/mol) | — | — | — | 327.57 | 703.84 | 470.95 | 522.94 |
| 40 | 3.8 | 850 | 425 | 54.92 | 110.15 | 122.84 | 122.76 |
| 70 | 1.25 | 2750 | 1375 | 17.02 | 34.13 | 38.06 | 38.03 |
| 100 | 0.85 | 4200 | 2100 | 11.14 | 22.34 | 24.92 | 24.9 |
| 750 | 0.2 | 18000 | 9000 | 2.60 | 5.21 | 5.81 | 5.81 |
| 3500 | 0.08 | 43500 | 21750 | 1.08 | 2.16 | 2.41 | 2.4 |
| 20000 | 0.04 | 77000 | 38500 | 0.61 | 1.22 | 1.36 | 1.36 |
| 80000 | 0.02 | 123000 | 61500 | 0.38 | 0.76 | 0.85 | 0.85 |

*Zr chelate is zirconium dipropoxide (bis-diethylcitrate); Hf chelate is hafnium dibutoxide (bis-acetylacetonate)

Additionally, reaction times, with or without heating, may vary from several minutes to several hours depending on reaction temperature and crosslinker concentration, with a preferred reaction time of 1 to 1.5 hours when the reaction is heated, and at least 4 hours when the reaction is carried out at room temperature. In some aspects, too short of a reaction time may leave excess volatiles remaining in the putty base, while too long of a reaction time and/or too high of a reaction temperature may lead to yellowing and possible degradation of the putty base. Crosslinking reactions may be carried out at room temperature up to 150° C. depending on the crosslinker. Those titanium crosslinkers containing chelating ligands such as acetylacetone or ethyl acetoacetate exhibited yellowing at prolonged reaction temperatures above 120° C. Significant yellowing of the product was also observed during initial mixing of the chelated complexes Tyzor® GBA and Tyzor® IBAY because both crosslinkers are deeply colored red-orange liquids. In contrast, translucent colorless putty bases were obtained using Tyzor® TOT, titanium isopropoxide, and zirconium n-propoxide. Preferred reaction temperatures ranged from 100° C. to 120° C. to ensure removal of volatiles from the products.

Characterization of Putty Bases:

Putty bases and putties may be characterized qualitatively by such attributes as whether they stretch when pulled gently, cleanly snap in two when pulled rapidly, or bounce when dropped from a height onto a hard surface. Quantitative characterization may be based on cold flow and plasticity. Cold flow is the property of both putty bases and putties in which a mass of material will flow in all directions generally uniformly under the effect of gravity and in the absence of heat. Cold flow of the putty bases was measured by forming four grams of unkneaded putty base into a small ball approximately 19 mm in diameter. The ball of putty base was placed on a flat surface and allowed to stand for 48 hours at ambient conditions. The diameter in millimeters of the resulting circular putty base puddle was then measured and indicated the degree of cold flow. The larger the diameter, the greater the degree of cold flow. Cold flow of putties may be measured using the same method.

Cold flow of putty bases generally increases with increasing viscosity/molecular weight of the starting OH-PDMS up to a constant value. For example, a putty base prepared from a 70 cP OH-PDMS and Tyzor® GBA had an initial cold flow of 36 mm. For a 100 cP OH-PDMS putty base and Tyzor® GBA, the cold flow increased to 43 mm, while for OH-PDMS with viscosities between 750 cP and 300,000 cP and Tyzor® GBA, the cold flow of the corresponding putty bases was in a very narrow range from 48-51 mm. For the putty base prepared from a very high viscosity OH-PDMS gum (e.g., Dowsil 1515), the cold flow was actually lower than expected, 38 mm.

The cold flow properties of a putty base may be modified by the incorporation of fillers, particularly reinforcing fillers such as fumed silica. Such fillers may substantially reduce cold flow. For example, for a putty base made from 100 cP OH-PDMS and Tyzor® GBA, including 10 wt % fumed silica (Cabosil® M5 from Cabot Corporation) in the reaction decreases the cold flow from 43 mm to 36 mm. Adding 20 wt % fumed silica further decreases the cold flow to 23 mm. Adding 50 wt % fumed silica produces an extremely stiff and unkneadable putty base with no cold flow.

Cold flow does not appear to be affected by choice of crosslinker. For example, the cold flow of putty bases made from a 20,000 cP OH-PDMS did not vary by more than 3 mm regardless of the titanium crosslinker used.

In addition to cold flow, the crosslinked putty bases and putties may be characterized by their plasticity, which is the tendency of a solid to undergo a permanent deformation under a load. It should be noted that the plasticity of putty bases and putties may vary considerably depending on the temperature of the putty, how long it has been since it was made, the presence of reinforcing additives, and whether it has been kneaded or manually manipulated in any way.

Plasticity was measured using a Williams Parallel Plate plastometer on a 4.0 g ball of freshly made unkneaded putty or putty base. The test method is based on ASTM D926-17 Standard Test Method for Rubber Property—Plasticity and Recovery (Parallel Plate Method) in that a spherical sample is compressed rather than a right cylinder and that only plasticity is measured. The measured value, given in mm, describes the final height of a known amount of material after compression with a load of 5 kg (49 N) for 3 minutes (e.g., the final distance in mm between the surfaces of each plate after 3 minutes of sample compression). The higher the value, the stiffer and less plastic the material.

It was found that plasticity depended on whether or not the ball of material had been kneaded prior to measurement. Freshly made unkneaded titanium-crosslinked putty bases and putties were stiffer and thus exhibited less plasticity than putty bases and putties that were kneaded prior to testing. The putty bases and putties do not exhibit any recovery or rebound when compressed in such a manner. It has been found, however, that putty bases and putties that had been softened by kneading eventually return after several hours of standing undisturbed to their initially stiff state. It was also found that for putties prepared from Tyzor® GBA and low MW OH-PDMS, e.g., those with high crosslink density, plasticity increased with increasing OH-PDMS viscosity/decreasing crosslink density up to a point (about 20,000 cP starting OH-PDMS) after which plasticity decreased with increasing OH-PDMS viscosity/decreasing crosslink density (the FIGURE). The putty sample with the lowest crosslink density, e.g. Dowsil® 1515 gum/GBA, had the lowest plasticity. For comparison, the plasticity of uncrosslinked Dowsil® 1515 gum was 1.42 mm.

Kneading may significantly temporarily increase plasticity. For example, the measured plasticity value decreased from 1.66 mm to 1.21 mm indicating an increase in plasticity for a putty base sample that was kneaded by hand for approximately 3 minutes. Warming of the putty during kneading may contribute to the increase in plasticity.

Various non-limiting aspects of the invention may be summarized as follows:

Aspect 1: A putty base comprising a crosslinked reaction product of:
i) at least one polydiorganosiloxane comprising at least two reactive functional groups; and
ii) at least one crosslinker capable of reacting with the reactive functional groups to form the crosslinked reaction product;
wherein the putty base is dilatant and comprises 0 to 0.1 weight percent of a boron-containing compound.

Aspect 2: The putty base according to Aspect 1, wherein the at least one crosslinker comprises at least one of aluminum alkoxides, chelated aluminum complexes, titanium alkoxides, chelated titanium complexes, zirconium alkoxides, zirconium chelates, hafnium alkoxides, chelated hafnium complexes, and mixtures thereof.

Aspect 3: The putty base according to either Aspect 1 or Aspect 2, wherein the at least one polydiorganosiloxane has a viscosity of about 25 cP or higher, and a weight average molecular weight (Mw) of about 500 Da or higher.

Aspect 4: The putty base according to any of Aspects 1-3, wherein the at least one polydiorganosiloxane has a viscosity about 70 cP or higher, and a weight average molecular weight (Mw) of about 2500 or higher.

Aspect 5: The putty base according to any of Aspects 1-4, wherein the at least one polydiorganosiloxane is a polydimethylsiloxane.

Aspect 6: The putty base according to any of Aspects 1-5, wherein the at least one polydiorganosiloxane comprises two reactive groups per molecule.

Aspect 7: The putty base according to any of Aspects 1-6, wherein the reactive groups are hydroxy groups.

Aspect 8: The putty base according to any of Aspects 1-7, wherein the at least one polydiorganosiloxane comprises two terminal reactive groups per molecule and wherein the reactive groups are hydroxy groups.

Aspect 9: The putty base according to any of Aspects 1-8, wherein the at least one polydiorganosiloxane comprises a linear polydimethylsiloxane, two terminal reactive groups per molecule and wherein the reactive groups are hydroxy groups.

Aspect 10: The putty base according to any of Aspects 1-9, wherein the crosslinker comprises at least one selected from the group consisting of titanium isopropoxide, titanium butoxide, titanium methoxide, titanium ethoxide, titanium 2-ethylhexyloxide, titanium propoxide, titanium dibutoxide (bis-acetylacetonate), titanium dibutoxide(bis-ethyl acetoacetate), titanium diisobutoxide(bis-ethyl acetoacetate), titanium diisopropoxide(bis-acetylacetonate), titanium diisopropoxide(bis-ethyl acetoacetate), titanium trimethylsiloxide, polydibutyltitanate, diethoxysiloxane-ethyltitanate copolymer, aluminum propoxide, aluminum isopropoxide, aluminum butoxide, aluminum methoxide, aluminum ethoxide diethoxysiloxane-butylaluminate copolymer, aluminum acetylacetonate, titanium bis(triethanolamine)diisopropoxide, triethanolamine aluminate, zirconium methoxide, zirconium ethoxide, zirconium n-propoxide, zirconium isopropoxide, zirconium n-butoxide, chelated zirconium alkoxide compounds, zirconium dipropoxide (bis-diethylcitrate), zirconium dibutoxide(bis-acetylacetonate), hafnium methoxide, hafnium ethoxide, hafnium propoxide, hafnium isopropoxide, hafnium butoxide, hafnium tert-butoxide, hafnium 2-ethylhexyloxide, chelated hafnium alkoxides, hafnium dibutoxide(bis-acetylacetone) and mixtures thereof.

Aspect 11: A putty comprising the putty base according to any of Aspects 1-10 and an additive.

Aspect 12: The putty according to Aspect 11, wherein the additive comprises at least one selected from the group consisting of silica, fumed silica, clays, micas, quartz, calcium carbonate, barium sulfate, glass powder, carborundum, emery, quartz powder, alumina, zirconia, pumice, microspheres, starches, lubricating oils, waxes, polydimethylsiloxane oils and gums, polyisobutylene rubbers, glycerin, density-reducing fillers, hollow microspheres, fragrances, colorants, and mixtures thereof.

Aspect 13: A method of making a dilatant putty base, comprising:
a) combining at least one polydiorganosiloxane comprising at least two reactive functional groups and at least one crosslinker capable of reacting with the at least two reactive functional groups to afford a reaction mixture; and
b) allowing the at least one polydiorganosiloxane and the at least one crosslinker to react to form the putty base;
wherein the putty base comprises 0 to 0.1 wt. % of a boron containing compound.

Aspect 14: The method of making the putty base according to Aspect 13, wherein the crosslinker comprises at least one selected from the group consisting of aluminum alkoxides, chelated aluminum complexes, titanium alkoxides, chelated titanium complexes, zirconium alkoxides, chelated zirconium complexes, hafnium alkoxides, chelated hafnium complexes, and mixtures thereof.

Aspect 15: The method of making the putty base according to either Aspect 13 or Aspect 14, wherein the at least one polydiorganosiloxane has a viscosity of about 25 cP or higher, and a weight average molecular weight (Mw) of about 500 Da or higher.

Aspect 16: The method of making the putty base according to any of Aspects 13-15, wherein the at least one polydiorganosiloxane has a viscosity of about 70 cP or higher, and a weight average molecular weight (Mw) of about 2500 Da or higher.

Aspect 17: The method of making the putty base according to any of Aspects 13-16, wherein the method further comprises a step of heating the reaction mixture.

Aspect 18: The method of making the putty base according to any of Aspects 13-17, wherein the at least one polydiorganosiloxane is a polydimethylsiloxane.

Aspect 19: The method of making the putty base according to any of Aspects 13-18, wherein the at least one polydiorganosiloxane comprises two reactive groups per molecule.

Aspect 20: The method of making the putty base according to any of Aspects 13-19, wherein the reactive groups are hydroxy groups.

Aspect 21: The method of making the putty base according to any of Aspects 13-20, wherein the at least one polydiorganosiloxane comprises two terminal reactive groups per molecule and wherein the reactive groups are hydroxy groups.

Aspect 22: The method of making the putty base according to any of Aspects 13-21, wherein the at least one polydiorganosiloxane comprises a linear polydimethylsiloxane, two terminal reactive groups per molecule and wherein the reactive groups are hydroxy groups.

Aspect 23: The method of making the putty base according to any of Aspects 13-22, wherein the crosslinker comprises at least one selected from the group consisting of titanium isopropoxide, titanium butoxide, titanium methoxide, titanium ethoxide, titanium 2-ethylhexyloxide, titanium propoxide, titanium dibutoxide(bis-acetylacetonate), titanium dibutoxide(bis-ethyl acetoacetate), titanium diisobutoxide(bis-ethyl acetoacetate), titanium diisopropoxide(bis-acetylacetonate), titanium diisopropoxide(bis-ethyl acetoacetate), titanium trimethylsiloxide, polydibutyltitanate, diethoxysiloxane-ethyltitanate copolymer, aluminum propoxide, aluminum isopropoxide, aluminum butoxide, aluminum methoxide, aluminum ethoxide diethoxysiloxane-butylaluminate copolymer, aluminum acetylacetonate, titanium bis(triethanolamine)diisopropoxide, triethanolamine aluminate, zirconium methoxide, zirconium ethoxide, zirconium n-propoxide, zirconium isopropoxide, zirconium n-butoxide, chelated zirconium alkoxide compounds such as zirconium dipropoxide (bis-diethylcitrate), zirconium dibutoxide(bis-acetylacetonate), hafnium methoxide, hafnium ethoxide, hafnium propoxide, hafnium isopropoxide, hafnium butoxide, hafnium tert-butoxide, hafnium 2-ethylhexyloxide, and chelated hafnium alkoxides such as hafnium dibutoxide(bis-acetylacetonate) and mixtures thereof.

Aspect 24: The method of making the putty base according to any of Aspects 13-23, wherein the reaction mixture is maintained between room temperature and 150° C.

Aspect 25: The method of making the putty base according to any of Aspects 13-24, further comprising a step of combining the at least one crosslinker with a non-aqueous solvent prior to step b), and wherein the method further comprises a step of allowing the non-aqueous solvent to evaporate from the putty base.

Aspect 26: A method of making a putty, wherein the method comprises the method of any of Aspects 13-25, further comprising a step of combining the putty base with an additive to form the putty.

Aspect 27: The method of making the putty according to Aspect 26 wherein the additive comprises at least one of silica, fumed silica, clays, micas, quartz, calcium carbonate, barium sulfate, pumice, glass powder, carborundum, emery, quartz powder, alumina, zirconia, microspheres, starches, lubricating oils, waxes, polydimethylsiloxane oils or gums, polyisobutylene rubbers, glycerin, density-reducing fillers, hollow microspheres, fragrances, colorants, and mixtures thereof.

Aspect 28: A method of making a putty comprising the steps of:
a) combining:
at least one polydiorganosiloxane comprising at least two reactive functional groups;
at least one additive; and
at least one crosslinker capable of reacting with the reactive functional groups,
to produce a reaction mixture, wherein the reaction mixture comprises less than 0.1 wt. % boron; and
b) allowing the crosslinker to react with the at least one polydiorganosiloxane to form the putty.

Aspect 29: The method of making the putty according to Aspect 28, wherein the at least one crosslinker comprises at least one selected from the group consisting of aluminum alkoxides, chelated aluminum complexes, titanium alkoxides, chelated titanium complexes, zirconium alkoxides, chelated zirconium complexes, hafnium alkoxides, chelated hafnium complexes, and mixtures thereof.

Aspect 30: The method of making the putty according to either Aspect 28 or Aspect 29, wherein the at least one polydiorganosiloxane has a viscosity of about 25 cP or higher, and a weight average molecular weight (Mw) of about 500 Da or higher.

Aspect 31: The method of making the putty according to any of Aspects 28-30, wherein the at least one polydiorganosiloxane has a viscosity of about 70 cP or higher, and a weight average molecular weight (Mw) of about 2500 Da or higher.

Aspect 32: The method of making the putty according to any of Aspects 28-31, wherein the method further comprises a step of heating the reaction mixture.

Aspect 33: The method of making the putty according to any of any of Aspects 28-32, wherein the at least one polydiorganosiloxane is a polydimethylsiloxane.

Aspect 34: The method of making the putty according to any of Aspects 28-33, wherein the at least one polydiorganosiloxane comprises two reactive groups.

Aspect 35: The method of making the putty according to any of Aspects 28-34, wherein the reactive groups are hydroxy groups.

Aspect 36: The method of making the putty according to any of Aspects 28-35, wherein the at least one polydiorganosiloxane comprises two terminal reactive groups per molecule and wherein the reactive groups are hydroxy groups.

Aspect 37: The method of making the putty according to any of Aspects 28-36, wherein the at least one polydiorganosiloxane comprises a linear polydimethylsiloxane comprising two terminal reactive groups per molecule, and wherein the reactive groups are hydroxy groups.

Aspect 38: The method of making the putty according to any of Aspects 28-37, wherein the crosslinker comprises one or more of titanium isopropoxide, titanium butoxide, titanium methoxide, titanium ethoxide, titanium 2-ethylhexyloxide, titanium propoxide, titanium dibutoxide(bis-acetylacetonate), titanium dibutoxide(bis-ethyl acetoacetate), titanium diisobutoxide(bis-ethyl acetoacetate), titanium diisopropoxide(bis-acetylacetonate), titanium diisopropoxide(bis-ethyl acetoacetate), titanium trimethylsiloxide, polydibutyltitanate, diethoxysiloxane-ethyltitanate copolymer, aluminum propoxide, aluminum isopropoxide, aluminum butoxide, aluminum methoxide, aluminum ethoxide diethoxysiloxane-butylaluminate copolymer, aluminum acetylacetonate, titanium bis(triethanolamine)diisopropoxide, triethanolamine aluminate, zirconium methoxide, zirconium ethoxide, zirconium n-propoxide, zirconium isopropoxide, zirconium n-butoxide, chelated zirconium alkoxide compounds such as zirconium dipropoxide (bis-diethylcitrate) and zirconium dibutoxide(bis-acetylacetonate), and mixtures thereof.

Aspect 39: The method of making the putty according to any of Aspects 28-38, wherein the reaction mixture is maintained between room temperature and 150° C.

Aspect 40: The method of making the putty according to any of Aspects 28-39, wherein the filler comprises at least one of silica, fumed silica, clays, micas, quartz, calcium carbonate, barium sulfate, pumice, glass powder, carborundum, emery, quartz powder, alumina, zirconia, microspheres, starches, lubricating oils, waxes, polydimethylsiloxane oils and gums, polyisobutylene rubbers, glycerin, density-reducing fillers, hollow microspheres, fragrances, colorants, and mixtures thereof.

Aspect 41: The method of making the putty according to any of Aspects 28-40, wherein the filler is fumed silica.

Aspect 42: The method of making the putty according to any of Aspects 28-41, further comprising a step of combining the at least one crosslinker with a non-aqueous solvent, and a step of allowing the non-aqueous solvent to evaporate from the putty.

EXAMPLES

The Examples as shown herein are illustrative and should not be considered to limit the scope of the invention.

Example 1A: Crosslinking OH-PDMS with Aluminum Isopropoxide Al(i-OPr)$_3$

Five grams of an OH-PDMS with a viscosity of 750 cP (e.g., Rhodorsil® V750 from Blue Star Silicones or an equivalent such as Andisil® OH 750 from AB Silicones) was added to a small glass vessel. Then 0.05 grams of finely ground aluminum isopropoxide (1 wt. %) was added to the liquid with vigorous stirring. The resulting mixture was then heated in an oil bath at 120° C. while being mixed to keep the crosslinker suspended as it dissolved and reacted. A sudden increase in viscosity was observed after 7-10 minutes of mixing. The viscous mixture was stirred occasionally for an additional 1-1.5 hours while being heated until a semi-solid gel was formed. The vessel was removed from heat and the mixture was allowed to cool, which afforded 4.69 g of a flowable, tacky elastic gel.

Example 1B: Crosslinking OH-PDMS with Aluminum Acetylacetonate Al(acac)$_3$

The reaction according to Example 1A was carried out, except that Al(acac)$_3$ was substituted for the Al(i-OPr)$_3$. The Al(acac)$_3$ reacted within a few minutes to afford a tacky putty-like gel that was somewhat elastic and exhibited a high degree of cold flow, but did not bounce. This was an unexpected result since Al(acac)$_3$ lacks any reactive alkoxides, i.e. Al(acac)$_3$ was not expected to react with the OH-PDMS.

Example 2: OH-PDMS Control

To eliminate the possibility that the reaction products of an OH-PDMS and an aluminum (or other metal) complex result from simple self-condensation of the OH-PDMS at elevated temperature, samples of several different OH-PDMS were heated in an oven at 120° C. for up to 10 days. Aside from a slight decrease in mass resulting from evaporation of volatile low molecular weight cyclic and linear siloxanes, no change in viscosity was observed.

The high relative OH content of low viscosity/low molecular weight hydroxyl-terminated polydimethylsiloxanes may be used advantageously to monitor the crosslinking reaction. One preferred low viscosity OH-PDMS is Dow's Xiameter® PMX-0930 OH-terminated PDMS fluid (40 cP, molecular weight=approximately 850 Da). This OH-PDMS was selected because it contains approximately 3.8 weight % OH which is readily observable by infrared spectroscopy (IR). Two vibrations of the SiOH group in the PMX-0930 were observed by IR: the broad SiO—H stretch at approximately 3300 cm$^{-1}$ and the Si—OH stretch at 891 cm$^{-1}$. Reaction monitoring relies on the fact that crosslinking results in a net decrease in SiOH groups, and therefore a decrease in intensity and eventual disappearance of the two SiOH vibrations in the IR spectrum may be observed as the crosslinking reaction progresses. For OH-PDMS viscosities above 100 cP, the SiOH content may be too low to be observed by infrared spectroscopy. When PMX-0930 was heated in the absence of any crosslinker for 1 week at 120° C., no viscosity increase or gel formation was observed. The intensity of the peaks at 3300 cm$^{-1}$ and 891 cm$^{-1}$ remained unchanged, demonstrating that the observed changes in the infrared spectrum of the crosslinking reaction were not due merely to heat-induced self-condensation.

Both aluminum isopropoxide and aluminum acetylacetonate were found to react at 110-120° C. with Xiameter® PMX-0930 at levels as low as 0.1 weight % to afford soft gels. Reactions were performed using 10, 5, 2.5, 1, 0.5, 0.25, and 0.1 weight % of each aluminum crosslinker. Reaction rate slowed considerably as the concentration of crosslinker decreased. Infrared spectroscopy of the reaction mixtures indicated eventual loss of the SiOH via the disappearance of the 3300 and 891 cm$^{-1}$ peaks even for very low (e.g., non-stoichiometric) crosslinker loadings. Flowable gels were obtained as the reaction products of PMX-0930 and aluminum acetylacetonate, while tough, lumpy materials resulted from reaction with aluminum isopropoxide. In contrast, when the same series of reactions is carried out at room temperature, no gel formation occurred, nor did the peaks associated with the terminal SiOH group disappear, even after several days.

Without intending to be bound by theory, an explanation for the behavior of the two aluminum complexes with PMX-0930 may be that while crosslinking may occur at elevated temperature with stoichiometric loadings of aluminum crosslinker, the main reaction at less than stoichiometric loading is Lewis acid-catalyzed homocondensation of the OH-PDMS to form a longer linear OH-PDMS. The combination of Lewis acid (either the aluminum acetylacetonate or the aluminum isopropoxide) and temperatures >100° C. may result in condensation of two terminal SiOH groups to form water and a new Si—O—Si bond. Notably, the higher the aluminum complex loading, the shorter the observed reaction time.

Both aluminum compounds, i.e., the isopropoxide complex and the acetylacetonate complex, also reacted when combined at 5 weight % with 500,000 cP Xiameter® PMX-200, an unfunctionalized (e.g., trimethylsiloxy-terminated) PDMS fluid available from Dow, to afford sticky putty bases after 3 hours at 150-170° C., similar to the reactivity initially observed in other embodiments with boric acid and PMX-200.

Titanium Compounds

In embodiments, several titanium compounds, including chelated complexes, reacted with all viscosity grades of OH-PDMS within minutes at room temperature to afford dilatant putty bases with characteristics identical or nearly identical to those obtained using boron compounds. As such, by providing a putty base with the characteristics of a boron-containing compound with the formulation of a regulatory-compliant putty having titanium compounds that are reactive at room temperature, the ease and efficiency of manufacturing non-boron putty compounds is greatly increased.

An additional advantage of the titanium crosslinkers is that they are liquids that are miscible with many anhydrous organic solvents and more importantly, miscible with OH-terminated PDMS. In contrast boric acid and many other boron compounds are solids with limited solubility in OH-PDMS, particularly at room temperature. Similarly, the aluminum compounds evaluated (aluminum isopropoxide and aluminum acetylacetonate) are solids with only moderate solubility in OH-PDMS. This limited solubility made the use of high levels of aluminum compounds for crosslinking low molecular weight OH-PDMS problematic. Yet another advantage of the liquid titanium crosslinkers is that they provide a route to translucent putty bases. In contrast, solid crosslinkers like boric acid lead to somewhat opaque or hazy putty bases.

As demonstrated in the following Examples, the reactivity varied considerably among the titanium crosslinkers. Titanium isopropoxide (Tyzor® TPT) exhibited the greatest reactivity, both toward OH-PDMS and sensitivity to moisture. Reaction with an OH-PDMS was immediate and occurred faster than the reactants could be mixed, leaving large masses of crosslinked gel dispersed in the unreacted OH-PDMS fluid. Substituting more sterically hindered alkoxy groups on titanium, for example, 2-ethylhexyloxy, as found in Tyzor® TOT, resulted in less moisture sensitivity (e.g., it does not fume), greater ease of handling, and slightly better mixing, which the inventor attributed to its slightly lower reactivity.

Substitution of a chelating ligand such as acetylacetone or ethyl acetoacetate for two alkoxy groups resulted in a dramatic decrease in both reactivity and sensitivity to moisture. Thus the titanium diisobutoxide(bis-ethyl acetoacetate) (e.g., Tyzor® IBAY) and titanium diisopropoxide(bis-acetylacetonate) (e.g., Tyzor® GBA) complexes were relatively stable toward moisture and reacted more slowly than even Tyzor® TOT. For both chelated complexes, however, the room temperature reaction appeared to be mostly complete within a few minutes of addition as judged by the formation of a stiff tacky gel similar to gels ultimately obtained for titanium isopropoxide and Tyzor® TOT.

One embodiment of a method of introducing reactive titanium crosslinkers is to dissolve them in either a volatile unreactive anhydrous organic solvent such as hexane, or a dry alcohol solvent such as isopropanol. Dilution of the reaction by solvent may reduce the rate of reaction as the reaction rate accelerates as the solvent evaporates. This method facilitates efficient mixing of the crosslinker with OH-PDMS. Advantageously, Tyzor® GBA is supplied as 75 wt. % solution of titanium diisopropoxide(bis-acetylacetonate) in a mixture of alcohols and is one example of a suitable crosslinker.

In an alternative embodiment, the OH-PDMS may be dissolved in a suitable anhydrous solvent in addition to, or instead of the crosslinker. The crosslinker may be difficult to mix efficiently with higher viscosity OH-PDMS regardless of its reactivity. For example, in the reaction of an OH-PDMS with a viscosity of approximately 20,000 cP with Tyzor® GBA (0.63 wt. %), the small relative amount of crosslinker is difficult to thoroughly mix into the viscous OH-PDMS. The solvent supplied with the crosslinker solution rapidly evaporates leading to localized gelation during the mixing process. Diluting the reaction with an appropriate solvent such as hexane prevents premature gelation allowing for complete mixing of the reactants.

Solvent can also be used to aid in both the mixing and completion of the reaction of partially reacted OH-PDMS gel with unreacted OH-PDMS fluid. When, for example, titanium isopropoxide was added directly to an OH-PDMS fluid, even with vigorous mixing, the result was a mixture of crosslinked gel and unreacted OH-PDMS fluid. The crosslinked gel may entrap an excess of unreacted crosslinker. Thus addition of a small amount of dry solvent such as hexane or isopropanol with mixing slowly dissolves the gel and redistributes the unreacted crosslinker into the unreacted OH-PDMS. The reaction proceeds to completion once the solvent has evaporated. In the absence of a solvent, it was observed that extensive lengthy mixing of crosslinked gel and unreacted OH-PDMS did eventually result in the formation of a crosslinked dilatant putty base.

In contrast to boric acid, its derivatives, and the two aluminum complexes described above, titanium complexes react slowly, if at all, at elevated temperature with non-functional PDMS. With boric acid, a putty base could be made from 500,000 cP Xiameter® PMX-200 PDMS fluid by heating 10-15 wt. % of boric acid at >150° C. for at least three hours with the unfunctionalized PDMS; no additional Lewis acid catalyst was required. When 15 wt. % of titanium isopropoxide was heated with the 500,000 cP Xiameter® PMX-200 at 180° C. for 6 hours, only a slight increase in viscosity was noted. A new small peak in the infrared spectrum was noted at 922 cm$^{-1}$, and was consistent with what has been observed for known Ti-crosslinked OH-PDMS putty bases.

Titanium isopropoxide. Titanium isopropoxide is a highly reactive and moisture sensitive compound; it hydrolyzes rapidly to $TiO_2$ and fumes in moist air unless precautions are taken to prevent exposure to atmospheric moisture. Suitable precautions include, for instance, handling it under a dry nitrogen or other inert gas blanket or even a dry (glove) box.

Example 3: Crosslinking OH-PDMS with Titanium Isopropoxide at Elevated Temperature 6.093 grams of an OH-PDMS with a viscosity of 3500 cP (e.g., Rhodorsil® V3500 or equivalent such as Andisil® OH 3500) was added to a small glass vessel. Then 0.041 grams of titanium isopropoxide (Sigma-Aldrich, but also available from Dorf Ketal as Tyzor® TPT) was added to a separate small beaker followed immediately by 3 to 4 grams of dry isopropanol. The titanium crosslinker-isopropanol solution was added slowly with vigorous stirring to the OH-PDMS. A rapid increase in viscosity followed by formation of a gel was observed. The resulting soft gel was heated at 120° C. to evaporate the isopropanol. After approximately 1 hour at 120° C., the vessel was cooled and the resulting stiff gel was removed and kneaded into a colorless transparent putty base; 5.872 g of putty base as recovered. The putty base exhibited the desired dilatant properties and could be bounced.

Slowing the reaction by dilution and slow addition of the crosslinker was advantageous because titanium isopropoxide is so reactive toward OH-PDMS. Immediate local gelation occurred upon addition if neat titanium isopropoxide was added to an OH-PDMS. Without wishing to be bound by theory, it may be that if neat titanium isopropoxide is added, the reaction occurs faster than the reaction can be stirred and the titanium crosslinker is effectively dispersed. Alternatively, dry hexane may be substituted for isopropanol.

Example 4: Crosslinking OH-PDMS with Titanium Isopropoxide at Ambient Temperature The procedure of Example 3 was repeated except that the mixture was maintained at room temperature. The isopropanol solvent was allowed to evaporate slowly under a stream of dry nitrogen at ambient temperature while the solution was stirred. After approximately 5 minutes, an increase in viscosity was noted. A colorless gel formed which was allowed to stand under a stream of nitrogen for 1 hour, after which the nitrogen was turned off and the soft gel allowed to stand overnight. The gel was kneaded into a transparent dilatant putty base indistinguishable from that produced in Example 3.

Example 5: Crosslinking OH-PDMS with Titanium 2-Ethylhexyloxide at Ambient Temperature Titanium 2-ethylhexyloxide (Tyzor® TOT) was used in this Example. The substitution of the bulkier ligand 2-ethylhexyloxide for the isopropoxide on titanium of Example 3 resulted in a titanium complex having reduced moisture-sensitivity and slightly lower reactivity compared to titanium isopropoxide. Without wishing to be bound by theory, it may be that the bulkier ligand decreases the rate of hydrolysis and solvolysis (for example reaction with the OH-PDMS) of the compound.

First, 5.354 grams of an OH-PDMS with a viscosity of about 20,000 cP obtained from Sigma-Aldrich was added to a glass vessel. Then 0.04 grams of Tyzor® TOT dissolved in approximately 3 mL dry hexane was added while stirring vigorously to afford a colorless transparent crosslinked gel within seconds at room temperature. The gel was thoroughly mixed for approximately 3-5 minutes before being allowed to stand for 1 hour. About 4.9 grams of gel were recovered. Kneading the gel resulted in a somewhat tacky putty base with an odor of 2-ethylhexanol. When this reaction is repeated at 110-120° C., a similar elastic putty resulted with a less pronounced odor of 2-ethylhexanol results. Heating the reaction at 150° C. resulted in a putty base that was very soft and tacky and exhibited two or three times more cold flow compared to those putty bases prepared at lower temperatures.

Titanium diisobutoxide(bis-ethyl acetoacetate) (e.g., Tyzor® IBAY) and Titanium diisopropoxide(bis-acetylacetonate) (e.g., Tyzor® GBA).

Substitution of chelating ligands such as ethyl acetoacetate or acetylacetone for two alkoxy groups resulted in stabilization of the titanium complex towards both water and other reactants relative to a titanium alkoxide. Tyzor® IBAY is a red-orange viscous liquid with a characteristic odor. A similar compound is Tyzor® GBA, which is titanium diisopropoxide(bis-acetylacetonate) dissolved in a mixture of alcohols. Both compounds reacted more slowly than the 2-ethylhexyloxide complex, and much more slowly than titanium isopropoxide. Reactivity may be moderated even further by diluting either the OH-PDMS and/or the chelated crosslinker with a dry organic solvent. The crosslinking reaction with an OH-PDMS proceeded gradually and appeared to accelerate as the solvent evaporated.

Without wishing to be bound by theory, it is believed that crosslinking reaction may occur via loss of the two alkoxy ligands leading to a linearly chain-extended polymer rather than a polymer with covalent inter-chain crosslinks. This is analogous to the crosslinking that occurs when a difunctional crosslinker such as a boronic acid [$RB(OH)_2$] reacts with an OH-PDMS to form a putty base. The properties of putty bases and putties prepared using difunctional crosslinkers such as Tyzor® GBA and IBAY are indistinguishable from those containing four alkoxy groups such as Tyzor® TPT and TOT. Gas chromatography-mass spectrometry (GCMS) analysis of the room temperature reaction products indicated that for both Tyzor® GBA and Tyzor® IBAY, only traces of free chelating ligands (acetylacetone and ethyl acetoacetate, respectively) were present in the putty base reaction products. Traces of the free chelating ligands were also found as impurities in the chelated complexes themselves.

The difunctional crosslinker nature of Tyzor® GBA and IBAY was also observed in the titanium isopropoxide (Tyzor® TPT), TOT, and NPZ (e.g., zirconium n-propoxide) complexes. This was surprising as initially it was believed that all four alkoxy groups would participate in crosslinking reactions. The wt. % crosslinker values given in Table 2 for Tyzor® TOT and TPT, and in Table 3 for Tyzor® NPZ reflect a calculated stoichiometry based on two alkoxy groups reacting. If all four alkoxy groups were to react, then only one-half the amount shown in the table would be needed to prepare a putty base. It was found that putty bases resulting from using one-half the indicated crosslinker concentration were extremely soft and sticky; they were quite different from those obtained using chelated titanium crosslinkers Tyzor® GBA and Tyzor® IBAY. Additional heating did not improve their properties. They exhibited some hallmarks of a dilatant putty base (e.g., stretching and snapping), but were clearly inferior putty bases due to their inherent softness and stickiness. If additional crosslinker were added to these putty bases and thoroughly mixed, for example with the aid of a compatible solvent, the expected stiff gels were obtained upon evaporation of the solvent. It is believed that at one-half the required crosslinker concentration, enough crosslinks formed that a weak (e.g., soft and sticky) gel was formed. The excessive plasticity of these gels may be the result of the entrapment of a large quantity of unreacted OH-PDMS and solvent. As an example, the plasticity measurement of the soft and sticky putty resulting from a 20,000 cP OH-PDMS and one-half (e.g., 0.37 wt. %) the required amount of Tyzor® TOT was 0.68 mm, which is almost twice the plasticity of the putty resulting from using the required amount (e.g., 0.73 wt. %) of crosslinker (e.g., 1.1 mm).

The difunctional crosslinker nature of both titanium isopropoxide and titanium 2-ethylhexyloxide may be demonstrated in an alternative manner. It was discovered that the alkoxy groups remaining after crosslinking, for example, 2-ethylhexanol on Tyzor® TOT-crosslinked OH-PDMS, may be displaced by chelating ligands. When two molar equivalents of acetylacetone dissolved in a small quantity of hexane was added to the putty base resulting from the reaction of Tyzor® TOT and a 100 cP OH-PDMS and heated to 120° C. briefly, the crosslinked OH-PDMS dissolved leaving a pale yellow viscous solution. Upon evaporation of the hexane solvent, the original gel was not recovered. Instead, a viscous liquid remained which smelled strongly of 2-ethylhexanol. GCMS analysis of this liquid indicated the presence of a trace amount of acetylacetone and a very large quantity of 2-ethylhexanol. The infrared spectrum of this mixture also indicated that a chelated acetylacetone ligand was present (signature peaks at 1609, 1588, and 1524 $cm^{-1}$), as was an aliphatic alcohol, identified as 2-ethylhexanol via GCMS. Infrared peaks characteristic of free acetylacetone (1728, 1709, and 1606 $cm^{-1}$) were absent. If instead the crosslinker behaved as a trifunctional crosslinker, there would only be one displaceable alkoxy ligand remaining, and treatment with two equivalents of acetylacetone would afford a mixture of products which would include free acetylacetone. If the crosslinker behaved as a tetrafunctional crosslinker, no displaceable alkoxy groups would be remain and no chelated acetylacetone would be found in the product.

Furthermore, addition of more Tyzor® TOT to the liquid above did not result in gel formation or an increase in viscosity, indicating that no OH-PDMS was displaced from the crosslinked polymer. This evidence suggests that acetylacetone displaced both remaining alkoxy groups affording a crosslinked polymer with the same structure as that obtained directly from the reaction of Tyzor® GBA with an OH-PDMS.

Surprisingly, there appeared to be two Ti—O vibrations in the initial product of acetylacetone and Tyzor® TOT-crosslinked OH-PDMS—one at 945 $cm^{-1}$ and one at 903 $cm^{-1}$. The vibration at 903 $cm^{-1}$ was about 1.5 times as intense as the one at 945 $cm^{-1}$. It may be significant that an average of the two values gives 924 $cm^{-1}$. The Ti—O vibration was found at about 923 $cm^{-1}$ in all putty bases regardless of crosslinker or OH-PDMS molecular weight. The spectrum of this compound was, aside from peaks attributable to 2-ethylhexanol, identical to that for the initial room temperature reaction product of Tyzor® GBA and an OH-PDMS.

When either Tyzor® GBA or IBAY reacted with an OH-PDMS at room temperature, the initial product had a similar arrangement of peaks attributed to the Ti—O bond at about 945 $cm^{-1}$ and 904 $cm^{-1}$. Neither peak was found in the infrared spectra of either neat GBA or IBAY which rules out unreacted crosslinker. Over a period of one to two hours at 110-120° C., the peaks at 945 $cm^{-1}$ and 904 $cm^{-1}$ decreased and a new peak at 924 $cm^{-1}$ grew. This same result occurred slowly at room temperature over the course of a few weeks. In contrast, the initial product of reactions of Tyzor® TOT or titanium isopropoxide with an OH-PDMS at room temperature had only a single peak attributed to a Ti—O vibration at 923 $cm^{-1}$.

For the GBA or IBAY-crosslinked putties, as the intensity of the peak at 924 $cm^{-1}$ increased, there was a decrease in the intensity of the peaks attributed to the chelated acetylacetone or ethyl acetoacetate ligands in the 1500-1650 $cm^{-1}$ region. This suggests that some loss of the chelated ligand is occurring during heating, which was confirmed by GCMS analysis of the heated product. Despite this apparent decomposition, surprisingly no detrimental effects were noted in the properties of the heated putty bases.

One effect of both titanium diisobutoxide(bis-ethyl acetoacetate) and titanium diisopropoxide(bis-acetylacetonate) is the yellow-orange color they impart to the resulting putty base which was more noticeable at higher loadings. This color could be either an advantage or disadvantage, depending on the desired color of the final putty. In addition, heating either the reaction mixture or the putty bases themselves above 120° C. for more than one hour resulted in significant additional yellowing, which may or may not be a desirable feature. If a colorless putty base is desired, then either titanium isopropoxide or titanium 2-ethylhexyloxide is preferred as the crosslinker.

Example 6: Crosslinking OH-PDMS with Titanium Diisobutoxide(bis-ethyl acetoacetate) (TYZOR® IBAY)

First, 5.0 grams of a 3500 cP OH-PDM with an OH content of 0.08 wt. % (Andisil® OH 3500) was added to a glass vessel. Then, 0.053 grams of titanium diisobutoxide (bis-ethyl acetoacetate), Tyzor® IBAY, was added with vigorous stirring. Formation of a pale yellow gel occurred within a few seconds which had an odor of isobutanol. The gel was isolated and kneaded into a pale yellow tacky elastic putty base. Alternatively the gel was heated at 100-120° C. for up to an hour to help remove residual isobutanol (b.p. 108° C.) and reduce the tackiness of the putty base. Heating to 120° C. for more than two hours results in the slow decomposition of the product as free ethyl acetoacetate as well as isobutyl acetoacetate are observed in the infrared spectrum and gas chromatogram. Isobutyl acetoacetate likely results from a transesterification reaction between ethyl acetoacetate and isobutanol which is known to be catalyzed by titanium alkoxide complexes.

GCMS analysis (either headspace GCMS or in a hexane solution) of the isolated putty bases prepared using either Tyzor® GBA or IBAY prior to volatile removal showed the presence of alcohols from either the solvents (e.g., Tyzor® GBA) or displaced alkoxy ligands (e.g., isobutanol, isopropanol), as well as traces of free acetylacetone and ethyl acetoacetate. Trace acetylacetone and ethyl acetoacetate were also present, respectively, in the GBA and IBAY crosslinkers prior to the reaction. It is believed that this is the source of the small quantity of chelating ligand found in the reaction products.

Putty bases made using the different titanium crosslinkers disclosed herein appear indistinguishable from each other in both appearance and properties. For example, putty bases made from a 20,000 cP OH-PDMS and titanium 2-ethylhexyloxide (Tyzor® TOT), titanium diisopropoxide(bis-acetylacetonate) (Tyzor® GBA), and titanium diisobutoxide (bis-ethyl acetoacetate) (Tyzor® IBAY) all had essentially the same physical properties including cold flow (48-50 mm) and plasticity (1.21-1.31 mm). It was observed that putty bases prepared using titanium crosslinkers exhibited increased adhesion to surfaces including glass and stainless steel.

In contrast to the high reactivity of both aluminum isopropoxide and $Al(acac)_3$ towards the low molecular weight OH-PDMS Dow PMX-0930 at very low loadings, the titanium compounds, even the highly reactive titanium isopropoxide, did not cause this OH-PDMS to gel. The behavior of the titanium complexes was similar to that of boron crosslinkers in that low levels of titanium complex were entirely consumed by the large excess of OH-PDMS present. IR studies of titanium complex-PMX-0930 reactions clearly showed formation of a Ti—O bond (e.g., Ti—O—Si) via the infrared peak observed around 922 $cm^{-1}$. As more Ti complex was added, the peak at 922 $cm^{-1}$ increased with a concomitant decrease in the SiO—H vibration at 3300 $cm^{-1}$. Approximately 15 wt. % of the titanium isopropoxide complex caused this low molecular weight OH-PDMS to gel sufficiently such that a very soft and tacky putty base could be isolated. This is slightly less than one half of the theoretical stoichiometric quantity of 33.4 wt %.

Furthermore, the titanium complexes did not cleave and react with unfunctionalized PDMS as did the boron and the aluminum compounds described above. Heating 5 wt. % of titanium isopropoxide with the 500,000 cP grade of Dow's PMX-200 polydimethylsiloxane at 150-170° C. for several hours did not result in the formation of a gelled material. Without wishing to be bound by theory, it may be that the Lewis acid strength of the titanium complexes is less than that of the aluminum complexes.

The titanium crosslinked putties appear to be stable toward both hydrolysis and alcoholysis. Boron-crosslinked putties are known to react with alcohols with decomposition. It can be shown by GCMS that an isopropanol solution of a boric acid-crosslinked putty contained a significant amount of triisopropylborate. Furthermore, upon evaporation of this solution at room temperature under a stream of nitrogen, the initial product recovered was an oily paste, not the original putty. If the paste was heated above 80° C., a putty was obtained that behaves similarly to the starting putty. It is believed that isopropanol attacks the boron crosslinks to form a borate ester and an OH-PDMS. For the titanium crosslinked putties, isopropanol merely swells and solubilizes the putty; room temperature evaporation of the isopropanol leads only to intact putty.

Infrared spectroscopy may be used to detect the formation of a low MW OH-PDMS if the crosslinked putty base reacts with isopropanol or water. For example, an infrared spectrum of an isopropanol solution of the putty base prepared from Andisil OH 70 and titanium isopropoxide indicated that no OH-PDMS was formed, even after heating. While the SiO—H region is obscured by the OH vibration from the alcohol, the Si—OH vibration around 891 $cm^{-1}$ was clearly absent while it was readily observable in the starting OH-PDMS. A similar lack of reactivity with pH 7 water was noted for the Ti-crosslinked putty bases. In contrast, if the putty base prepared from boric acid and a slight molar excess of Andisil OH 70 (or an even lower MW OH-PDMS) was dissolved in isopropanol, the infrared spectrum of the solution contains a peak at 891 $cm^{-1}$ corresponding to the Si—OH vibration of the OH-PDMS that has formed. Since a slight molar excess of OH-PDMS relative to the boric acid was used, virtually no unreacted boric acid should remain after crosslinking. Any triisopropylborate which forms upon treatment with iPrOH must then result from alcoholysis of the crosslinked putty base.

Zirconium Compounds:

Zirconium alkoxides such as zirconium n-propoxide, commercially available as Tyzor® NPZ (70 wt % actives in 1-propanol), rapidly crosslinked hydroxy-terminated polydimethylsiloxanes to afford colorless translucent putty bases with ultimate physical properties inferior to those crosslinked with titanium alkoxides. Filled putties could be made using zirconium alkoxides in either one step (e.g., adding all ingredients together prior to addition of the zirconium crosslinker), or by blending additives directly to a crosslinked putty base. The resulting putty bases and putties, when freshly prepared, behaved similarly to their titanium analogs in that they stretch, snap, and bounce, and exhibit cold flow. Over a period of several hours, the putty bases and putties became stiffer and fractured even when stretched gently or flexed severely. They were not self-cohesive (e.g., pieces do not stick together easily), exhibit significantly reduced cold flow, and crumble when kneaded. They could be slowly compressed by hand into a ball which bounced.

Zirconium propoxide behaved similarly to titanium isopropoxide in that only two alkoxide groups are displaced by the silanol groups from two OH-PDMS. When a stoichiometric amount of Tyzor® NPZ, calculated based on the reaction of only two propoxides, was reacted with an OH-PDMS, the soft, flexible putty base described above resulted which lacked elasticity. If one-half the amount of Tyzor® NPZ was used, (e.g. using the calculated stoichiometry for all four propoxide groups reacting), an extremely soft and sticky putty base which easily broke apart resulted. Without wishing to be bound by theory, is believed that at 50 wt. % crosslinker loading, enough crosslinks are present to transform the liquid OH-PDMS into a sticky semi-solid gel, but not enough for the desired dilatant properties. Additional crosslinking is required to attain desired physical properties of a dilatant putty; this occurred when additional Tyzor® NPZ solution was added to the gel. If the amount of zirconium crosslinker was decreased further, then only a high viscosity liquid resulted. Furthermore, treatment of the gel resulting from Tyzor® NPZ with 2 equivalents of acetylacetone resulted in displacement of the two remaining propoxy groups by acetylacetone as determined by infrared spectroscopy. Three peaks associated with chelated acetylacetone were present (e.g., 1609, 1597, and 1527 $cm^{-1}$) and peaks associated with free acetylacetone were absent.

Chelation of a zirconium alkoxide resulted in significantly slower crosslinking of an OH-PDMS requiring up to several hours to form a putty base with marginal dilatant properties. An example of a suitable commercially available chelated zirconium alkoxide complex is zirconium di-propoxide(bis-diethylcitrate) (75% in alcohols, Gelest Inc.) which is also available from Dorf Ketal as Tyzor® ZEC. The alcohol solution of the zirconium chelate is an extremely viscous liquid with limited solubility in solvents other than alcohols.

Example 7: Crosslinking OH-PDMS with Zirconium n-Propoxide (TYZOR® NPZ)

5.0 g of a 100 cP hydroxy-terminated polydimethylsiloxane with an OH content of 0.85 wt. % (e.g. Andisil® OH 100) was added to a stainless steel beaker. Approximately 10 g of hexane was added and the mixture stirred. A solution of 0.555 g Tyzor® NPZ (70 wt % in n-propanol, 11.1 wt % actives) in 3 g hexane was prepared and added dropwise with stirring to the mixture in the beaker. A clear colorless soft gel formed immediately which absorbed all solvent. The gel was mixed vigorously for 1-2 minutes and then allowed to stand for 12 hours to allow the solvents to evaporate. 4.82 grams of a rubbery friable gel were recovered. The initial gel exhibited dilatant properties. A peak tentatively assigned to the Zr—O vibration appeared at 943 $cm^{-1}$ in the infrared spectrum. This putty base had a plasticity of 2.16 mm and a cold flow of 41 mm.

Example 8: Crosslinking OH-PDMS with Zirconium Dipropoxide (bis-diethylcitrate)

0.251 grams of zirconium dipropoxide (bis-diethylcitrate) (75 wt % in a mixture of n-propanol/ethanol) was added to a small glass vial. Approximately 1.0 g of n-propanol was added, the vial purged with dry nitrogen, sealed, and heated at about 80° C. until the crosslinker dissolved completely. 1.0 g of a 100 cP hydroxy-terminated polydimethylsiloxane with an OH content of 0.85 wt. % (e.g. Andisil® OH 100) was then added to the crosslinker solution, the vial was again sealed and heated at 80° C. for 1 hour. No viscosity change was noted, although the solution was now a suspension of white droplets. The vial was uncapped and the solvent was allowed to evaporate overnight. 0.96 g of an opaque white gel with weak dilatant properties resulted. The material stretched when pulled slowly but tended to break apart instead of snapping cleanly when pulled sharply.

Hafnium Compounds:

Hafnium alkoxides and chelated hafnium alkoxides crosslinked OH-PDMS to afford soft putty bases similar in properties to those resulting from crosslinking with zirconium complexes. For example, hafnium butoxide (45% solution in hexanes, Gelest Inc.) reacted instantly with an OH-PDMS to afford a gel with weak dilatant properties. The initial product stretched slightly before snapping and bounced slightly when dropped onto a hard surface. The putty base exhibited cold flow but over time lost most of its ability to stretch; instead the putty base snapped cleanly when stretched gently and crumbled when kneaded. The reaction may be slowed down by further dilution of either the crosslinker solution, the OH-PDMS, or both with no effect on the resulting putty base properties.

Chelation of the hafnium resulted in a slower reaction but no difference in the properties of the crosslinked putty base. An example of a suitable chelated hafnium alkoxide is hafnium dibutoxide(bis-acetylacetone), available from Gelest as a 50 wt % solution in toluene/n-butanol. When combined with an OH-PDMS, the chelated hafnium complex slowly crosslinked as the solvents evaporated to afford a clear slightly yellow gel which had dilatant properties similar to those of a freshly-made zirconium-crosslinked putty base. This gel, while initially stiff and non-tacky, slowly softened over a period of several hours, becoming sticky with a noticeable decrease in its dilatant properties.

As was observed for zirconium-crosslinked putty bases, heating hafnium-crosslinked putty bases at temperatures as low as 80° C. for more than 10 minutes to drive off volatiles resulted in a dramatic rapid decrease in the viscosity of the gel. Prolonged heating at 80° C. resulted in a slow increase in viscosity such that a material resembling the initial stiff gel was formed after several hours. This behavior was not seen in the putty bases resulting from crosslinking with titanium complexes; such gels when heated at 80° C. only softened slightly. At temperatures above 120° C., however, titanium crosslinked putty bases formed highly viscous fluids which solidified upon cooling.

Example 9: Crosslinking OH-PDMS with Hafnium Butoxide 5.0 g of a 750 cP hydroxy-terminated polydimethylsiloxane with an OH content of 0.2 wt. % (e.g. Andisil® OH 750, AB Specialty Silicones) was added to a stainless steel beaker. Hexane (5.0 g) was added and the solution mixed. To this was added 0.314 g of hafnium butoxide (45 wt. % solution in hexane, Gelest Inc.) with rapid mixing. Gelation occurred almost instantly despite the additional dilution with hexane. A chunky, translucent, slightly yellow gel with the odor of butanol resulted almost immediately. The gel was heated for 5 min at 110° C. to evaporate the remaining hexane and residual butanol. 4.85 g of a clear slightly yellow dilatant putty base was recovered. Plasticity of a 4.0 g ball was 2.18 mm; 48-hour cold flow was 46 mm.

Example 10: Crosslinking OH-PDMS with Hafnium Dibutoxide (bis-acetylacetonate)

5.0 g of a 100 cP hydroxy-terminated polydimethylsiloxane with an OH content of 0.85 wt. % (e.g. Andisil® OH 100) was added to a stainless steel beaker. To this is added 1.27 g of hafnium dibutoxide(bis-acetylacetonate) (technical grade solution in toluene/n-butanol, 50 wt. % actives, Gelest Inc.). The mixture was stirred vigorously for 2-3 minutes while the viscosity gradually increases. A clear slightly yellow soft gel formed with a strong solvent odor. The gel was allowed to stand for 12 hours to allow the solvents to evaporate. 4.87 grams of a tacky soft putty base was recovered. The initial gel exhibited dilatant properties even when still "wet" with residual solvent; it stretched when slowly pulled and snapped when sharply pulled. A peak tentatively assigned to the Hf—O vibration appeared at 955 $cm^{-1}$ in the infrared spectrum. Heating the gel at 110° C. to drive off residual solvent resulted in first liquefaction of the gel, followed by a slow increase in viscosity. After 7 hours at 110° C., the gel solidified to a tough and stiff mass which bounced but only broke when stretched and crumbled when kneaded. Plasticity of a 4.0 g ball of the heated putty base: 4.17 mm; 48-hour cold flow: 38 mm.

Preparation of Putties:

Putties with a variety of properties may be prepared via different methods. Adding a fumed silica such as Cabosil® M5 from Cabot as a reinforcing filler to the reaction mixture prior to the addition of the Al, Ti, Zr, or Hf crosslinker resulted in a stiffer, more resilient putty. Adding the fumed silica filler to already formed putty base resulted in a less stiff and resilient putty, although the stiffness and resilience were greater than those of an unfilled putty base. There appeared to be a positive synergistic effect on putty properties by crosslinking an OH-PDMS in the presence of silica. A similar effect was observed with a pigmented calcium carbonate-based clay-like filler, although the material was only slightly tackier when the clay-like filler was added after the crosslinking reaction, rather than with the other ingredients

Example 11: Crosslinking OH-PDMS with a Titanium Crosslinker in the Presence of Fumed Silica 5.0 g of a 70 cP hydroxy-terminated polydimethylsiloxane with an OH content of 1.25 wt. % (e.g. Andisil® OH 70) was added to a stainless steel beaker. Cabosil® M5 fumed silica (0.500 g, 10 wt. % based on OH-PDMS) was thoroughly dispersed into the OH-PDMS. To this pasty mixture was added 0.898 g of a 75 wt. % solution of titanium diisopropoxide(bis-acetylacetonate) in alcohols (e.g., Tyzor® GBA), and the resulting mixture stirred vigorously and thoroughly for 2-3 minutes. An increase in viscosity was noted after 30 seconds of mixing. The pasty mixture was heated at 120° C. for 1 hour. The viscosity increased significantly after 1 minute of heating and a viscous semi-solid formed by 30 minutes. Upon cooling 4.827 g of an amber semi-translucent putty base was recovered. A peak at 923 $cm^{-1}$ was observed in its infrared spectrum and assigned to the Ti—OSi vibration. The putty base exhibited the characteristics of a dilatant material; it stretched when pulled slowly (low stress), and snapped/shattered when pulled rapidly (high stress) and had a cold flow of 30 mm. If the same loading of fumed silica was simply blended into the pre-crosslinked putty base, a putty resulted that was less stiff and had slightly greater cold flow (33 mm) than that described in this example.

Example 12: Crosslinking OH-PDMS with a Titanium Crosslinker in the Presence of Fumed Silica The same reaction as in Example 11 was carried out except that 20 wt. % Cabosil® M5 was used. The resulting putty was a very stiff, rubbery material which exhibited very little cold flow (22 mm) but bounced.

Additional fillers and combinations of fillers may be incorporated at different loadings into putty bases to form putties with different physical properties. These may be blended into pre-crosslinked putty bases or may be introduced prior to the addition of crosslinker. Examples include but are not limited to lubricating oils, waxes, plasticizers, glycerin, calcium carbonate, density-reducing fillers (e.g., hollow microspheres; calcium carbonate coated hollow microspheres), clays, micas, starches, polymeric materials, fragrances and colorants.

Example 13: Crosslinking OH-PDMS with an Aluminum Crosslinker in the Presence of Fumed Silica and a Pigmented Clay-Like Filler 2.0 g of a 100 cP hydroxy-terminated polydimethylsiloxane with an OH content of 0.85 wt. % (Andisil® OH 100) was added to a glass beaker. To this was added 0.100 g fumed silica and 1.0 g of a premade pigmented clay-like mixture of calcium carbonate (80 wt. %), titanium dioxide (0.6 wt. %), wax (8.4 wt. %), and lubricating oil (11 wt. %). The pigmented clay-like mixture can be added component by component, but it is more convenient to add it pre-mixed in a single step to the reaction mixture. The reaction mixture was warmed briefly and mixed until homogeneous. To this mixture was added 0.200 g (10 wt. % based on OH-PDMS) aluminum acetylacetonate with vigorous stirring. The reaction mixture was heated at 120° C. for 1.5 hours with occasional mixing; a noticeable increase in viscosity occurred after approximately 30 minutes of heating and a small amount of sublimed aluminum acetylacetonate was observed on the walls of the beaker. Upon cooling, 1.88 g of a soft off-white putty was recovered. The putty exhibited the characteristics of a dilatant material; it stretched when pulled slowly (low stress), and snapped when pulled rapidly (high stress).

Example 14: Crosslinking OH-PDMS with a Titanium Crosslinker in the Presence of Fumed Silica and a Pigmented Clay-Like Filler 3.10 g of a 100 cP hydroxy-terminated polydimethylsiloxane with an OH content of 0.85 wt. % (Andisil® OH 100) was added to a stainless steel beaker. To this was added 0.150 g fumed silica and 1.50 g of the same premade pigmented clay-like mixture described in Example 13. The reaction mixture was warmed briefly and mixed until homogeneous. To this mixture was added 0.358 g (11.6 wt. % based on OH-PDMS) Tyzor® GBA solution with vigorous stirring. A noticeable increase in viscosity occurred after 2-3 minutes of stirring at room temperature, at which time the reaction mixture was heated at 120° C. for 1.5 hours. Upon cooling, 4.37 g of an off-white putty was recovered. A peak at 922 cm$^{-1}$ was observed in its infrared spectrum. The putty exhibited the characteristics of a dilatant material; it stretched when pulled slowly (low stress), and snapped/shattered when pulled rapidly high stress).

Example 15: Putty Preparation by Blending of Clay-Like Filler into Crosslinked Putty Base A putty base was prepared using the identical procedure as described in Example 14 except that silica and the clay mix were omitted. To 2.0 grams of this putty base was blended 0.857 grams of the pre-made pigmented clay-like mix described in Example 13. At this scale, blending was accomplished by kneading by hand, although any suitable blending method known in the art may be used. An off-white putty resulted that is similar to but slightly softer than the putty in Example 14.

It was found that viable putties could be made using the inferior (soft and sticky) putty bases resulting from the reaction of an OH-PDMS with only one-half the required amount of crosslinker (e.g., Tyzor® TOT, TPT) if an appropriate filler was used. If 5 wt. % fumed silica was added to the reaction, a much stiffer and less sticky putty resulted that exhibited dilatant properties. Similarly, adding approximately 30 wt. % of the clay-like mix without adding fumed silica to the reaction also improved the putty's properties compared to the unfilled partially crosslinked putty base.

The presence of fumed silica in the formula also improves the properties of other poorly performing putties. For example, a putty made using a 20,000 cP OH-PDMS, pigmented clay mix, and 0.63 wt. % Tyzor® GBA resulted in a putty which only stretched when pulled. It does not snap when pulled suddenly nor does it bounce when a ball of it is dropped. If 10 wt. % fumed silica (based on OH-PDMS) was added to the reaction in addition to the pigmented clay mix, the resulting putty exhibited the ability to snap when pulled sharply and bounce when dropped.

The presence of fumed silica and the pigmented clay mix likewise significantly improved the properties of a putty base made by crosslinking a 100 cP OH PDMS with a solution of hafnium dibutoxide(bis-acetylacetonate). Whereas the corresponding soft hafnium crosslinked putty base simply snaps when stretched and crumbles when kneaded, adding a reinforcing filler surprisingly allowed the now stiffened hafnium cross-linked putty to be stretched several centimeters before snapping.

Example 16: Putty Preparation Using Zirconium n-Propoxide to Crosslink OH-PDMS 2.0 g of a 100 cP hydroxy-terminated polydimethylsiloxane with an OH content of 0.85 wt. % (Andisil® OH 100) was added to a stainless steel beaker. To this was added 0.10 g fumed silica and 0.985 g of a premade pigmented clay-like mixture of calcium carbonate (80 wt. %), titanium dioxide (0.6 wt. %), wax (8.4 wt. %), and lubricating oil (11 wt. %). The mixture was thoroughly mixed for approximately 5 minutes. Then 0.232 g of a 70% solution of zirconium n-propoxide was added to the mixture and thoroughly mixed. A crumbly off-white gel formed within seconds. The gel was heated at 110° C. for 15 min to evaporate the solvents. A stiff, brittle, off-white putty resulted which bounced but crumbled when kneaded. The putty snapped cleanly into two pieces regardless of the stretching force or rate.

Example 17: Putty Preparation Using Hafnium Dibutoxide (bis-acetylacetonate) to Crosslink OH-PDMS A putty was prepared using the identical procedure as described in example 16 except that 0.52 g of a 50 wt % solution of hafnium dibutoxide (bis-acetylacetonate) in toluene/n-butanol was substituted for the zirconium n-propoxide solution. The mixture was stirred vigorously for approximately 5 minutes during which time the mixture thickened considerably. The mixture was then heated at 110° C. to evaporate the solvents. A stiff, brittle, off-white putty resulted which bounced but crumbled when kneaded. The putty snapped cleanly into two pieces regardless of the stretching force or rate.

In some embodiments, the invention herein can be construed as excluding any element or process that does not materially affect the basic and novel characteristics of the composition or process. Additionally, in some embodiments, the invention can be construed as excluding any element or process not specified herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of making a putty base, comprising:
   a) combining at least one non-crosslinked polydiorganosiloxane comprising at least two reactive functional groups and at least one crosslinker capable of reacting with the at least two reactive functional groups to afford a reaction mixture; and
   b) allowing the at least one non-crosslinked polydiorganosiloxane and the at least one crosslinker to react to form the putty base;
   wherein the putty base is dilatant, exhibits cold flow, and comprises less than 0.9 ppm weight of organotin compounds and the at least one crosslinker consists essentially of at least one of aluminum alkoxides, chelated aluminum complexes, titanium alkoxides, chelated titanium complexes, zirconium alkoxides, zirconium chelates, hafnium alkoxides, chelated hafnium complexes, and mixtures thereof.

2. The method of making the putty base according to claim 1, wherein the crosslinker comprises at least one selected from the group consisting of aluminum alkoxides, chelated aluminum complexes, titanium alkoxides, chelated titanium complexes, zirconium alkoxides, chelated zirconium complexes, hafnium alkoxides, chelated hafnium complexes, and mixtures thereof.

3. The method of making the putty base according to claim 1, wherein the at least one polydiorganosiloxane has a viscosity of about 25 cP or higher, and a weight average molecular weight (Mw) of about 500 Da or higher.

4. The method of making the putty base according to claim 1, wherein the at least one polydiorganosiloxane comprises two reactive groups per molecule.

5. The method of making the putty base according to claim 1, wherein the reactive groups are hydroxy groups.

6. The method of making the putty base according to claim 1, wherein the reaction mixture is maintained between room temperature and 150° C.

7. A method of making a putty, wherein the method comprises the method of claim 1, further comprising a step of combining the putty base with an additive to form the putty, wherein the putty is dilatant.

8. The method of making the putty according to claim 7 wherein the additive comprises at least one of silica, fumed silica, clay, mica, quartz, calcium carbonate, barium sulfate, pumice, glass powder, carborundum, emery, quartz powder, alumina, zirconia, microsphere, starches, lubricating oils wax, polydimethylsiloxane oil, polydimethylsiloxane gum, polyisobutylene rubber, glycerin, density-reducing filler, hollow microsphere, fragrance, colorant, and mixtures thereof.

9. A putty base made according to the method of claim 1.

10. A method of making a putty comprising the steps of:
    a) combining:
       at least one non-crosslinked polydiorganosiloxane comprising at least two reactive functional groups;
       at least one additive; and
       at least one crosslinker capable of reacting with the reactive functional groups, to produce a reaction mixture, wherein the reaction mixture comprises less than 0.1 wt. % boron; and
    b) allowing the crosslinker to react with the at least one non-crosslinked polydiorganosiloxane to form the putty;
    wherein the putty is dilatant, exhibits cold flow, and the at least one crosslinker comprises less than 0.9 ppm weight of organotin compounds and consists essentially of at least one of aluminum alkoxides, chelated aluminum complexes, titanium alkoxides, chelated titanium complexes, zirconium alkoxides, zirconium chelates, hafnium alkoxides, chelated hafnium complexes, and mixtures thereof.

11. The method of making the putty according to claim 10, wherein the at least one crosslinker comprises at least one selected from the group consisting of aluminum alkoxides, chelated aluminum complexes, titanium alkoxides, chelated titanium complexes, zirconium alkoxides, chelated zirconium complexes, hafnium alkoxides, chelated hafnium complexes, and mixtures thereof.

12. The method of making the putty according to claim 10, wherein the at least one non-crosslinked polydiorganosiloxane has a viscosity of about 25 cP or higher, and a weight average molecular weight (Mw) of about 500 Da or higher.

13. The method of making the putty according to claim 10, wherein the at least one non-crosslinked polydiorganosiloxane comprises two reactive groups.

14. The method of making the putty according to claim 10, wherein the reactive groups are hydroxy groups.

15. The method of making the putty according to claim 10, wherein the reaction mixture is maintained between room temperature and 150° C.

16. The method of making the putty according to claim 10, wherein the filler comprises at least one of silica, fumed silica, clay, mica, quartz, calcium carbonate, barium sulfate, pumice, glass powder, carborundum, emery, quartz powder, alumina, zirconia, microspheres starches, lubricating oil, wax, polydimethylsiloxane oil, polydimethylsiloxane gum, polyisobutylene rubber, glycerin, density-reducing filler, hollow microsphere, fragrance, colorant, and mixtures thereof.

17. A putty made according to the method of claim 10.

* * * * *